US012459679B1

(12) United States Patent
Rudin et al.

(10) Patent No.: US 12,459,679 B1
(45) Date of Patent: Nov. 4, 2025

(54) IMPACT-ATTENUATING TIP FOR A STRUCTURAL MEMBER OF AN AIRCRAFT

(71) Applicant: Wing Aviation LLC, Palo Alto, CA (US)

(72) Inventors: Adem Eminoğlu Rudin, Santa Clara, CA (US); Elizabeth Chase Marshman, San Francisco, CA (US); Aaron Bryce Christian, Redwood City, CA (US); Jesse Hayden Blake, Palo Alto, CA (US); André Peter Prager, Sunnyvale, CA (US)

(73) Assignee: Wing Aviation LLC, Palo Alto, CA (US)

( * ) Notice: Subject to any disclaimer, the term of this patent is extended or adjusted under 35 U.S.C. 154(b) by 0 days.

(21) Appl. No.: 18/778,668

(22) Filed: Jul. 19, 2024

(51) Int. Cl.
*B64U 20/30* (2023.01)
*B64U 30/29* (2023.01)
*B64U 101/00* (2023.01)

(52) U.S. Cl.
CPC .......... *B64U 20/30* (2023.01); *B64U 30/29* (2023.01); *B64U 2101/00* (2023.01)

(58) Field of Classification Search
CPC ........ B64U 20/00; B64U 20/30; B64U 20/40; B64U 20/50; B64U 30/29; B64U 30/293; B64U 2101/00; B64U 2101/26; B64U 2101/28; B64U 2101/29; B64U 2101/40; B64U 2101/70; B64U 30/12; B64U 30/14; B64U 30/16; B64U 30/291; B64U 30/292; B64U 2101/64
USPC ....................................................... 244/129.1
See application file for complete search history.

(56) References Cited

U.S. PATENT DOCUMENTS

| | | | | |
|---|---|---|---|---|
| 11,091,256 B2* | 8/2021 | Cappelleri | ............... | B64U 50/19 |
| 2019/0144097 A1* | 5/2019 | Benson | .................. | B64U 10/25 |
| | | | | 244/131 |
| 2019/0329857 A1* | 10/2019 | Benson | ................... | F16B 2/065 |
| 2019/0340569 A1* | 11/2019 | Prager | ................. | G06Q 10/0832 |
| 2020/0070968 A1* | 3/2020 | Prager | ................ | B64D 25/00 |
| 2021/0316847 A1* | 10/2021 | Predonu | .................. | B64U 10/20 |
| 2021/0380233 A1* | 12/2021 | Cappelleri | ............. | G05D 1/654 |
| 2023/0373661 A1* | 11/2023 | Uchibori | ................. | B64U 30/26 |
| 2023/0399124 A1* | 12/2023 | Karydis | ................. | G01D 5/142 |

FOREIGN PATENT DOCUMENTS

| | | | | |
|---|---|---|---|---|
| CN | 117864470 A | * | 4/2024 | ............. B64U 20/30 |
| JP | 6818189 B1 | * | 1/2021 | ............. A01M 29/16 |
| KR | 2732371 B1 | * | 11/2024 | ........... B64C 39/024 |

* cited by examiner

*Primary Examiner* — Joshua E Rodden
(74) *Attorney, Agent, or Firm* — McDonnell Boehnen Hulbert & Berghoff LLP

(57) ABSTRACT

An uncrewed aerial vehicle (UAV) includes a support extending along a flight direction of the UAV. The support includes an elongate structural member, a cap coupled to a front end of the elongate structural member, and an energy absorber. The support extends along an axis that runs through the support from a front end to a rear end. The cap is coupled to the front end of the elongate structural member. The cap includes a support platform that has a front surface opposite the elongate structural member and that extends outward from the axis. The energy absorber is disposed on the front surface of the support platform and includes a crushable material configured to absorb energy under impact. The UAV also includes a first propeller unit coupled to the support.

19 Claims, 20 Drawing Sheets

IMPACT-ATTENUATING TIP FOR A STRUCTURAL MEMBER OF AN AIRCRAFT

BACKGROUND

An uncrewed vehicle, which may also be referred to as an autonomous vehicle, is a vehicle capable of travel without a physically-present human operator. The term "unmanned" may sometimes be used instead of, or in addition to, "uncrewed," and it should be understood that both terms have the same meaning, and may be used interchangeably. An uncrewed vehicle may operate in a remote-control mode, in an autonomous mode, or in a partially autonomous mode.

When an uncrewed vehicle operates in a remote-control mode, a pilot or driver that is at a remote location can control the uncrewed vehicle via commands that are sent to the uncrewed vehicle via a wireless link. When the uncrewed vehicle operates in autonomous mode, the uncrewed vehicle typically moves based on pre-programmed navigation waypoints, dynamic automation systems, or a combination of these. Further, some uncrewed vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of uncrewed vehicles exist for various different environments. For instance, uncrewed vehicles exist for operation in the air, on the ground, underwater, and in space. Examples include quad-copters and tail-sitter UAVs, among others. Uncrewed vehicles also exist for hybrid operations in which multi-environment operation is possible. Examples of hybrid uncrewed vehicles include an amphibious craft that is capable of operation on land as well as on water or a floatplane that is capable of landing on water as well as on land. Other examples are also possible.

SUMMARY

The present embodiments are directed to an impact-attenuating tip for an elongate structural member of an aircraft. The tip aids in mitigating damage if the elongate structural member experiences direct impact during a collision.

In one aspect, an uncrewed aerial vehicle (UAV) is provided. The UAV includes a support extending along a flight direction of the UAV. The support includes an elongate structural member, a cap coupled to a front end of the elongate structural member, and an energy absorber. The support extends along an axis that runs through the support from a front end to a rear end. The cap is coupled to the front end of the elongate structural member. The cap includes a support platform that has a front surface opposite the elongate structural member and that extends outward from the axis. The energy absorber is disposed on the front surface of the support platform and includes a crushable material configured to absorb energy under impact. The UAV also includes a first propeller unit coupled to the support.

In another aspect, another uncrewed aerial vehicle (UAV) is provided. The UAV includes a support extending along a flight direction of the UAV. The support includes an elongate structural member, a cap coupled to a front end of the elongate structural member, and deformable structure. The support extends along an axis that runs through the support from a front end to a rear end. The cap is coupled to the front end of the elongate structural member. The cap includes a support platform that has a front surface opposite the elongate structural member and that extends outward from the axis. The deformable structure is supported by the cap and disposed in front of the elongate structural member. The deformable structure is configured to spread outward from the axis upon impact from an initial position to an impact position. The UAV also includes a first propeller unit coupled to the support.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
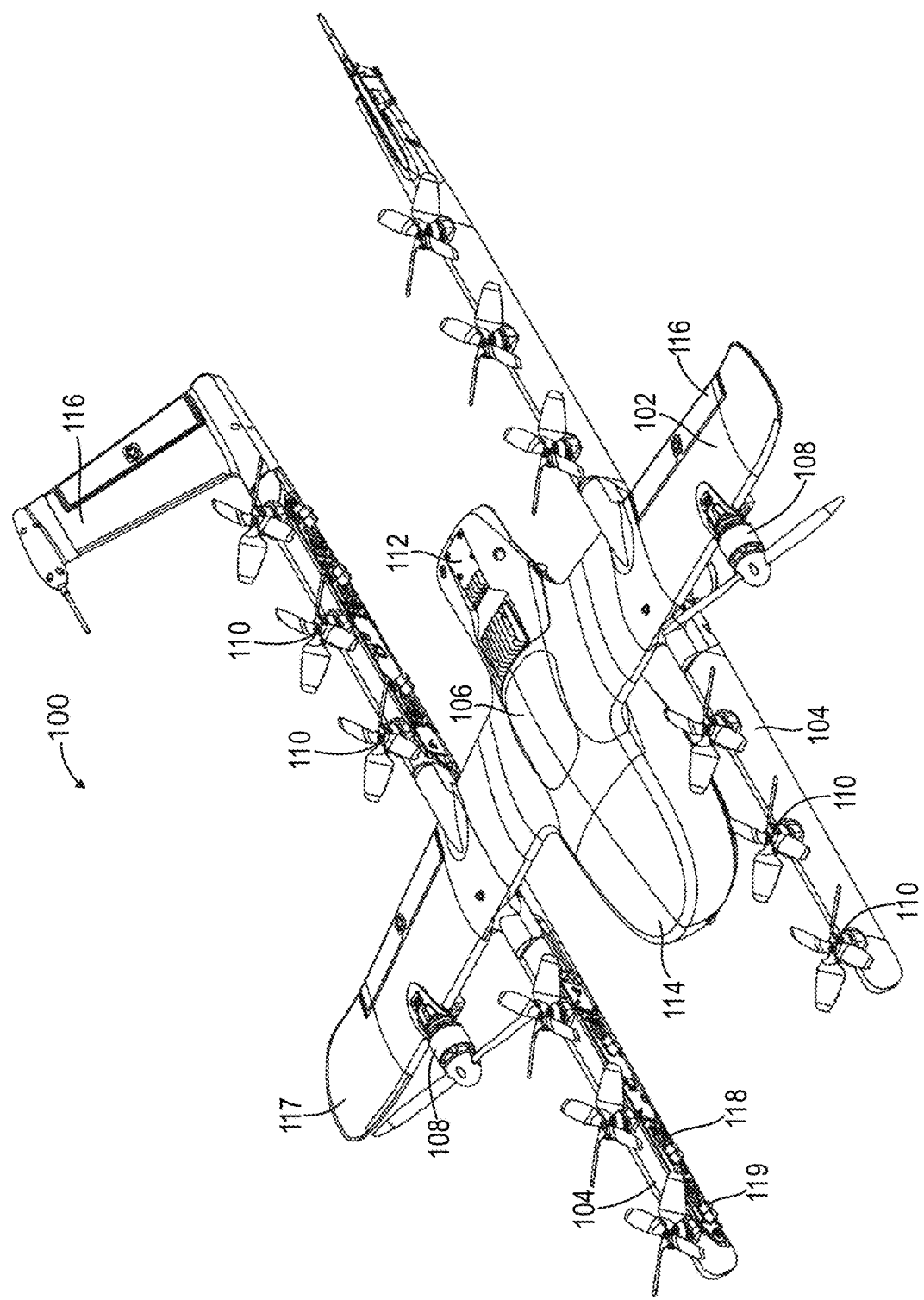
FIG. 1A is a simplified illustration of an uncrewed aerial vehicle, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

The present embodiments are related to uncrewed aerial vehicles (UAVs) or uncrewed aerial systems (UASs) (referred to collectively herein as UAVs) that include airframes with elongate structural members. The UAVs include features to limit damage during collisions that occur at the end of one of the elongate structural members, particularly when the UAV is moving in a direction that is aligned with the direction of the structural member. These features help avoid the entire force of the collision being concentrated in a small area associated with the cross-sectional area of the structural members.

Described herein are various embodiments of a joiner that is used to secure elongate structural members together and transfer flight loads between the members. The joiner is also configured to separate the two structural members when an axial force on an end of one of the structural members exceeds a predetermined threshold, such during a collision. This allows a portion of the UAV to separate from the leading structural member, to avoid the inertia of the entire UAV being transferred to the impact object.

Also described herein are various embodiments of an impact attenuating tip adapted to be positioned on an end of an elongate structural member. The impact attenuating tips include a support platform that is adapted to spread the force of a collision over a greater area than the cross-sectional area of the elongate structural member. The tips also include elements that deform to absorb energy and/or further spread the force of the collision.

Further details and various embodiments of such separable joiners and impact-attenuating tips are described in more detail below.

II. Illustrative Uncrewed Vehicles

Herein, the terms "uncrewed aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "uncrewed aerial vehicle system" (UAVS), or "uncrewed aerial system" (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
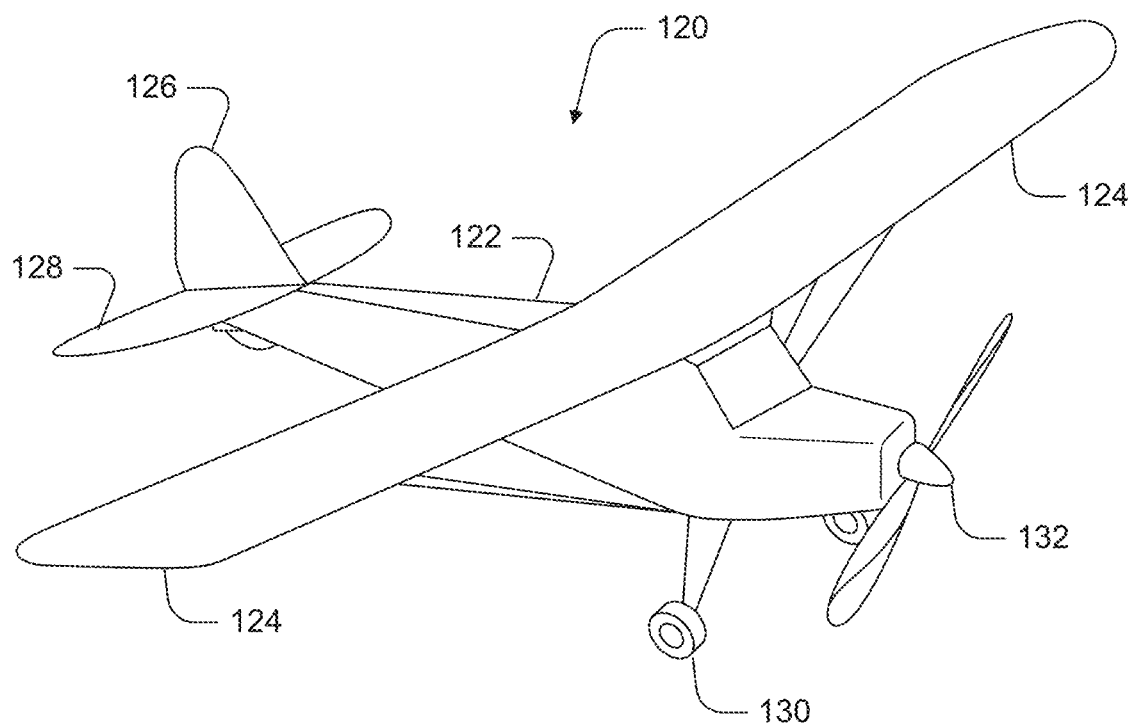
FIG. 1B is a simplified illustration of an uncrewed aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
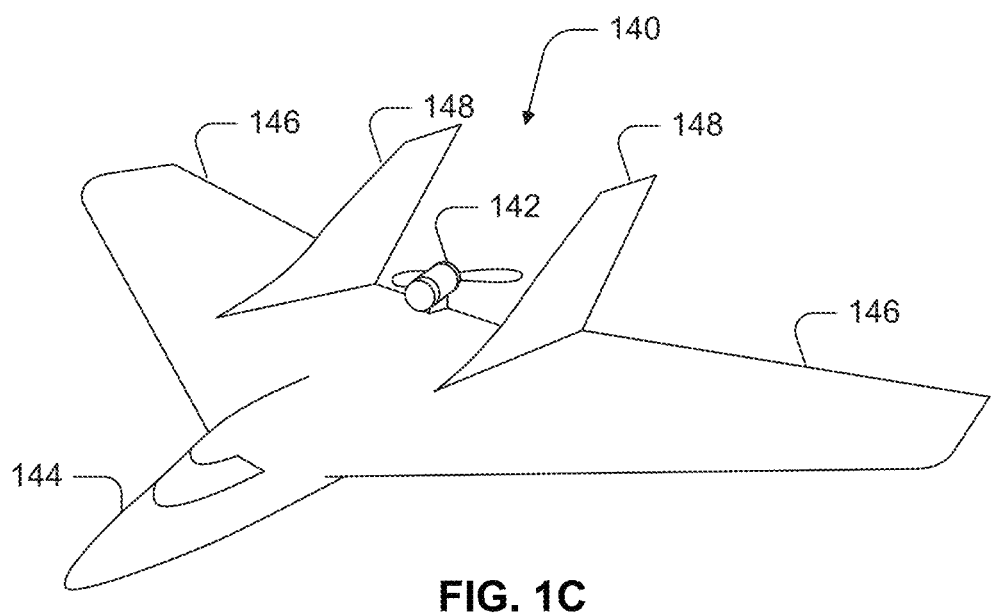
FIG. 1C is a simplified illustration of an uncrewed aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
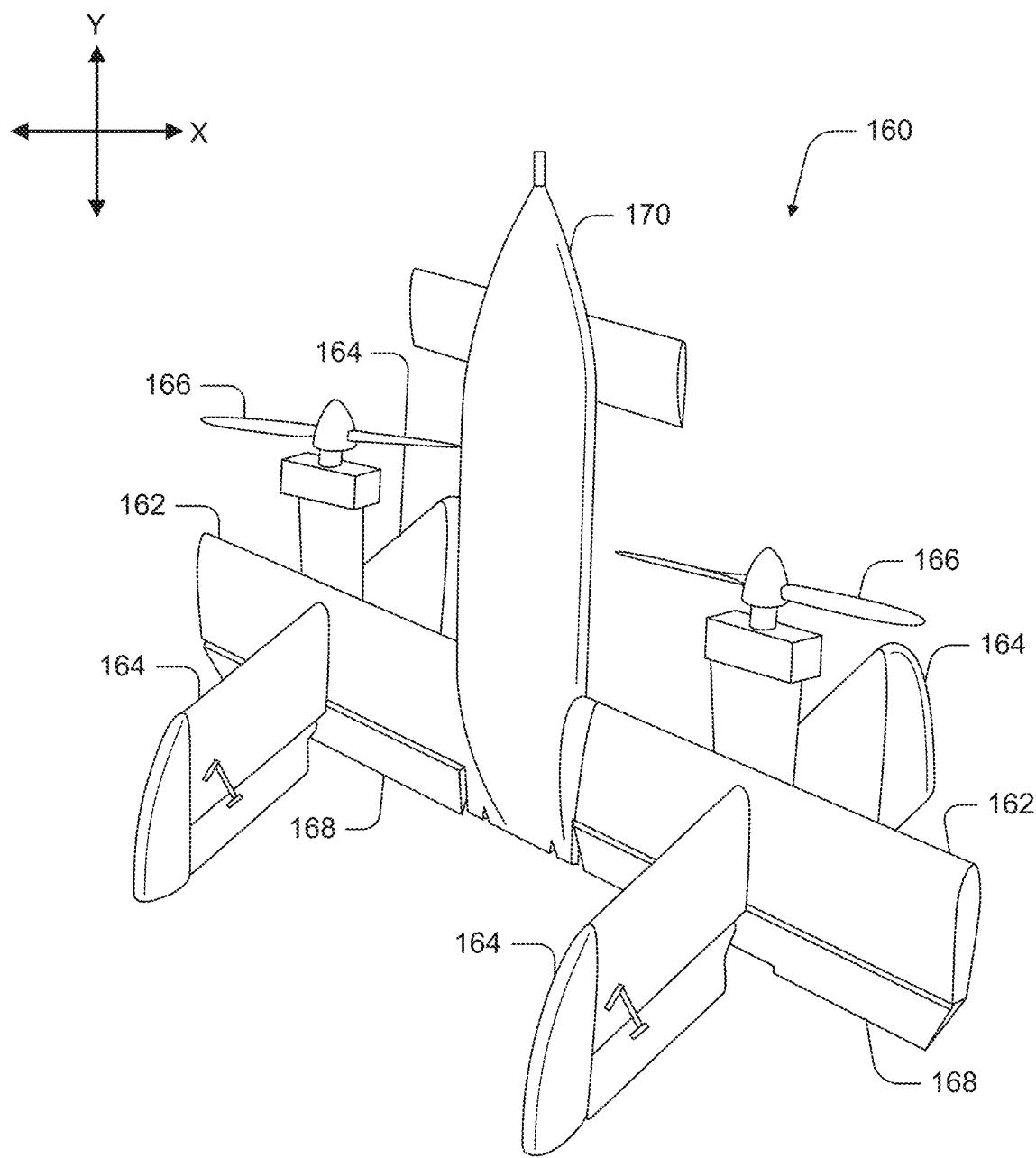
FIG. 1D is a simplified illustration of an uncrewed aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
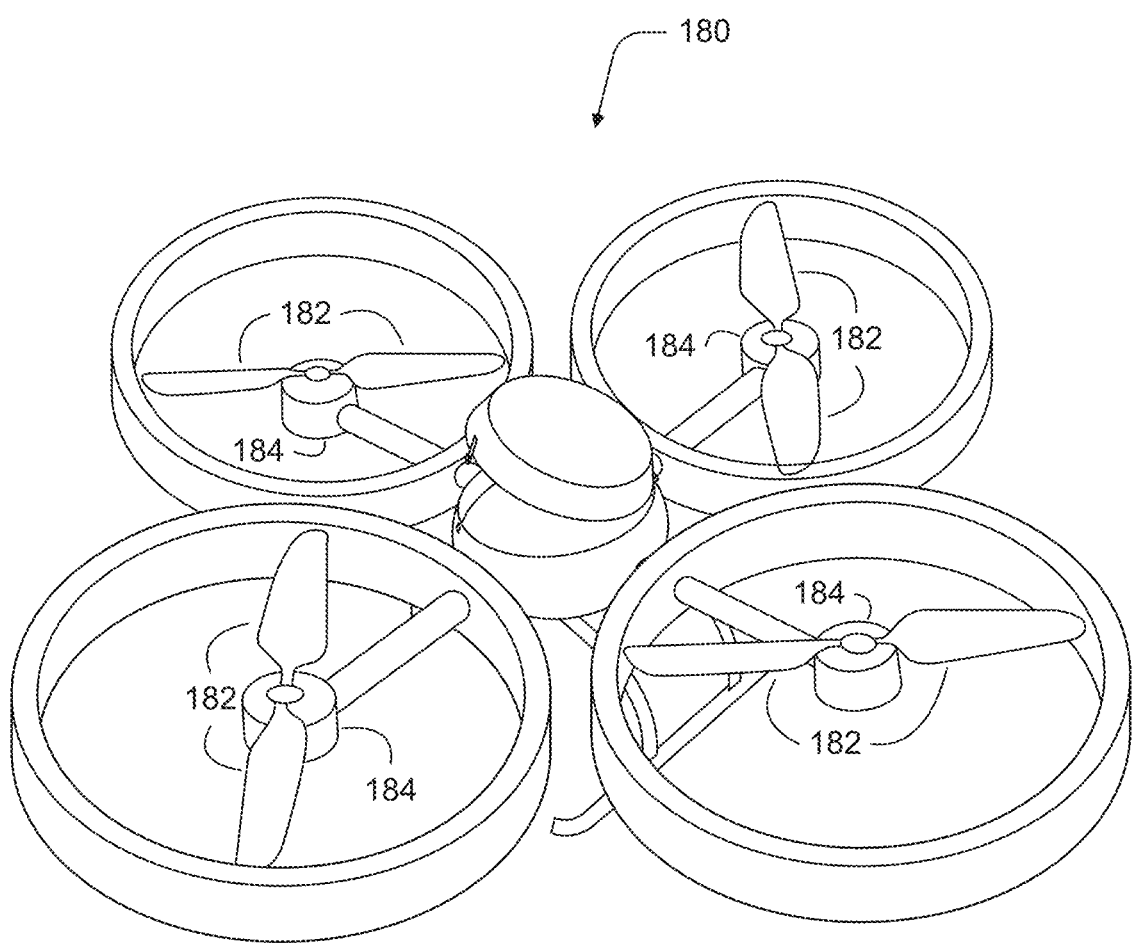
FIG. 1E is a simplified illustration of an uncrewed aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "uncrewed" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of uncrewed aerial vehicle.

III. Illustrative UAV Components

Figure 2:
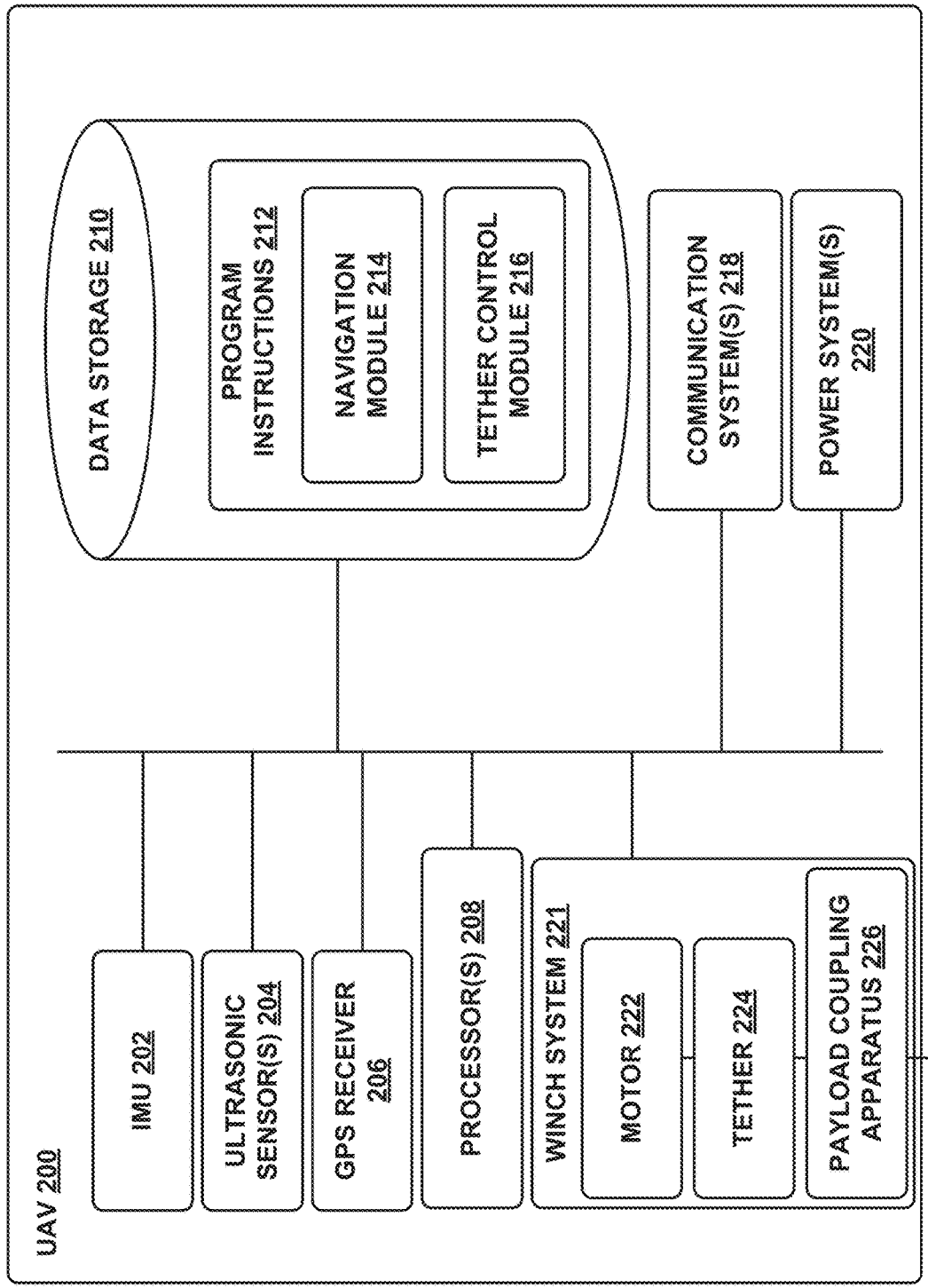
FIG. 2 is a simplified block diagram illustrating components of an uncrewed aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for uncrewed vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with uncrewed vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron (s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
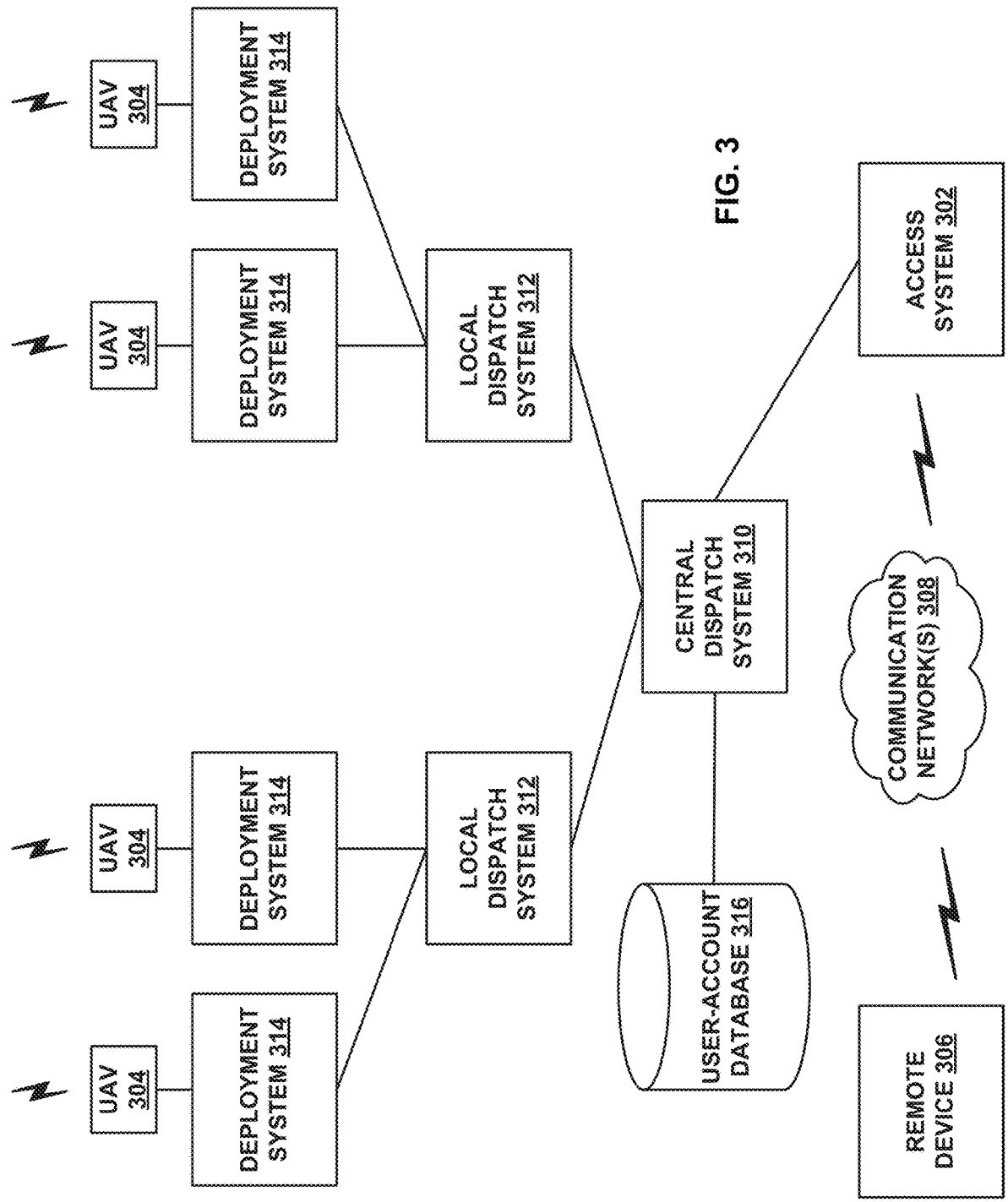
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Illustrative Impact Attenuating Features

The present disclosure sets forth various embodiments of impact attenuation features for an aircraft that has an elongate member that extends in the direction of flight. Some of the embodiments relate to a cap that couples to the front end of the elongate member and is configured to spread impact forces over a larger area and/or absorb energy during impact. Other embodiments relate to a separable joiner that couples the elongate member to another member of the aircraft and allows the elongate member to disconnect from the rest of the aircraft during an impact.

Embodiments of a UAV in accordance with the disclosure may include any of the described embodiments of a separable joiner, any of the described embodiments of an end cap, or any combination of both the described embodiments of a separable joiner and the described embodiments of an end cap. Thus, the separable joiner may be used with or without an end cap, the end caps may be used with or without the separable joiner, or they may be used in combination. Further, embodiments of a UAV in accordance with the disclosure may include other impact attenuation features.

Figure 4:
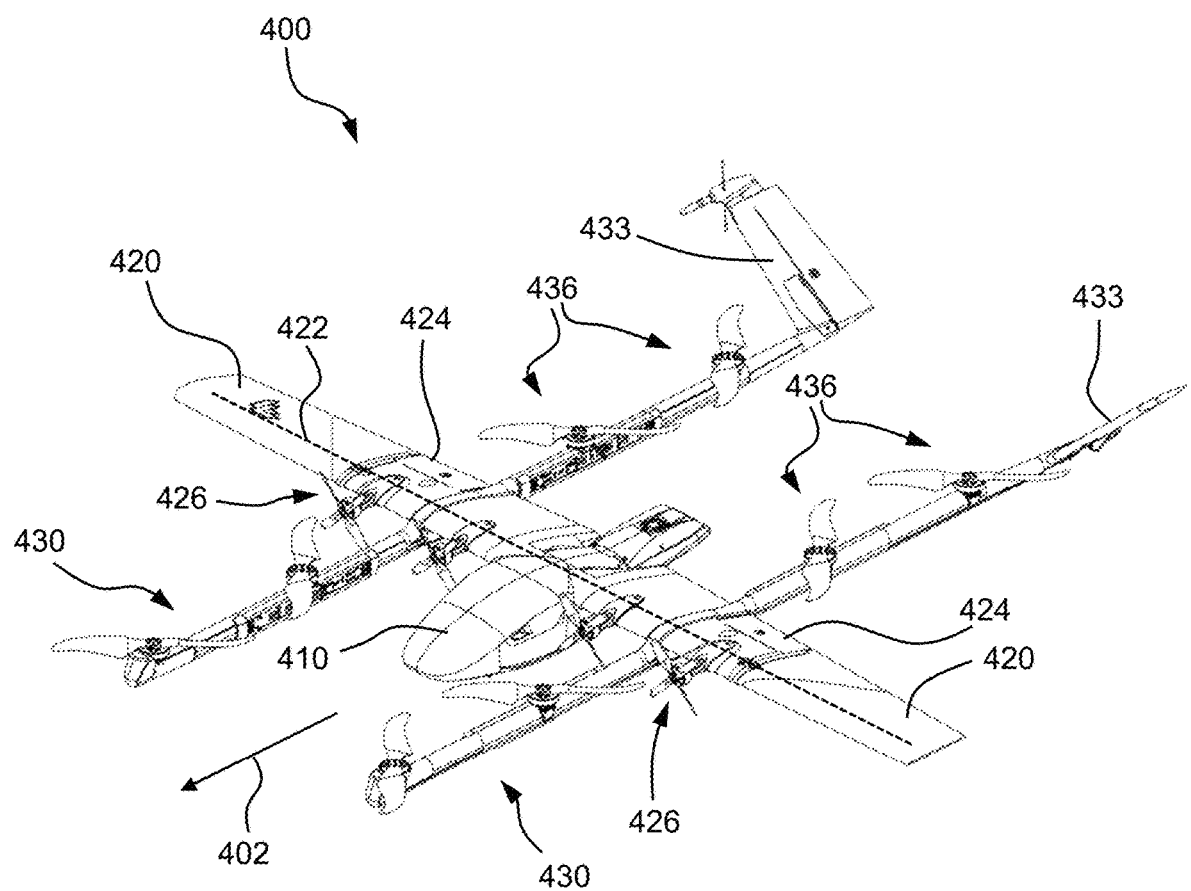
FIG. 4 is a perspective view of a UAV according to an example embodiment.

FIG. 4 illustrates an exemplary uncrewed aerial vehicle (UAV) 400 that includes both impact attenuating caps on the end of elongate members as well as separable joiners in accordance with the disclosure. UAV 400 includes a fuselage 410 that may house batteries and control systems of the UAV. The fuselage may also include mechanisms for securing and delivering a payload, such as a winch held in the interior of the fuselage. Wings 420 extend outward from either side of the fuselage 410 in a lateral direction and are operable to provide lift to the UAV as the UAV flies in a second direction 402 that is perpendicular to the direction in which the wings 420 extend. The wings 420 may also include control surfaces 424 for controlling movement of the UAV 400 as it flies. Several front-facing propellers 426 are mounted on the wings 420 and are operable to provide thrust to the UAV 400.

The UAV 400 also includes a pair of booms 430 that are coupled to the wings 420 and extend in second direction 402. The booms 430 form a support for a plurality of lift propeller units 436 that allow the UAV 400 to move vertically or hover while in flight. At the tail end of each boom 430 is a stabilizer 433 that extends upward and laterally outward. Together, the two stabilizers 433 have a V-shaped configuration and each stabilizer may include a control surface that forms a ruddervator for controlling pitch and yaw of the UAV 400.

The structure of UAV 400 is provided by an airframe including a spar 422 (depicted schematically), which forms a structural member extending along the length of the wing 420 and two structural members that form the support element of the booms 430. The structural members of the booms 430 extend perpendicular to the spar 422 and in the direction of flight of the UAV 400.

Figure 5A:
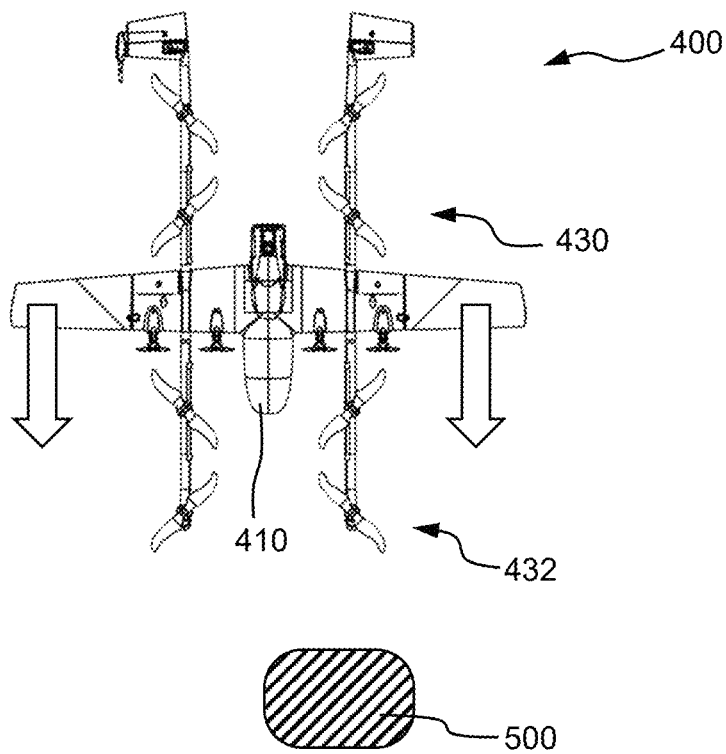
FIGS. 5A and 5B illustrate the UAV of FIG. 4 during a collision.
Figure 5B:
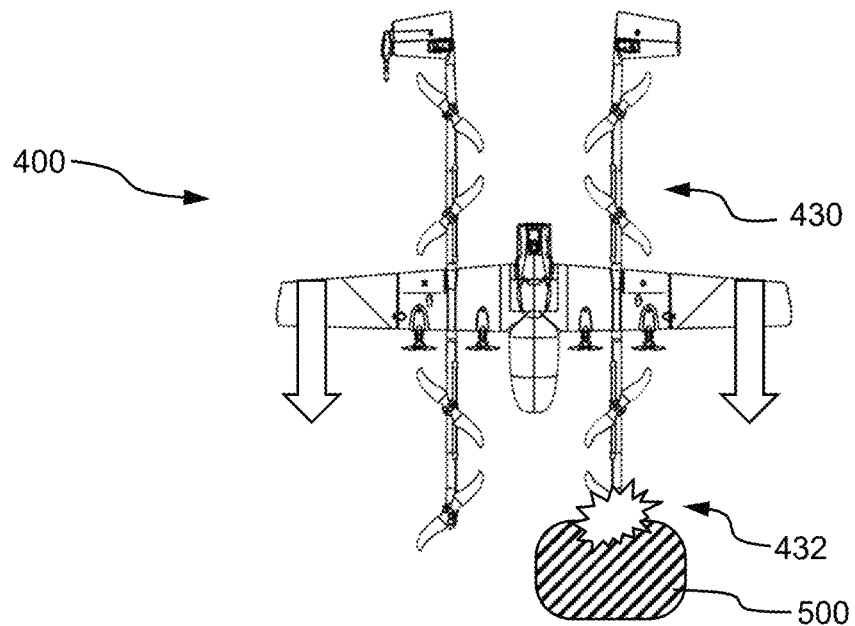

UAV 400 includes several features to mitigate a front-end impact if the UAV experiences a collision with a structure, object, or individual. FIGS. 5A and 5B illustrate a schematic depiction of UAV 400 traveling in a flight direction and colliding with an impact object 500. The impact object 500 is positioned along the flight path such that one of the booms 430, which extends to the forward-most end of the aircraft, will collide with the object 500, as shown in FIG. 5B. In view of the elongate geometry of the structural member of the boom 430, the inertia of the UAV 400 will be concentrated on a relatively small area. Accordingly, to mitigate the effect of the collision, the UAV includes two impact attenuation features related to the boom, as described in more detail below. First, the front end 432 of the boom 430 includes a structure to absorb and/or spread the energy of the collision. Further, the UAV 400 includes a joiner that is configured to disconnect the boom 430 from the rest of the UAV upon impact.

Further, the front end of the fuselage 410 of the UAV 400 includes an impact-absorbing structure, such as a crumple zone or crushable material to absorb impact. In addition, the ends of the wings are configured to break and disconnect in response to an impact with a force above a predetermined threshold. While the illustrated UAV 400 includes all of the aforementioned impact attenuation features, each of these features may be used independently or in any combination to mitigate damage during collisions.

The impact attenuation features described herein are helpful to mitigate impact with various different aircraft configurations. These features may be particularly useful in aircraft that include wings, as such aircraft may be inclined to continue gliding along a flight path even if a malfunction has occurred. Accordingly, mitigating impacts at the end of structural members extending in the direction of flight may be particularly valuable if the aircraft includes a wing. On the other hand, collisions during flight are also possible even without malfunctions, and thus, the described impact attenuation features may be beneficial for many aircraft configurations.

Figure 6:
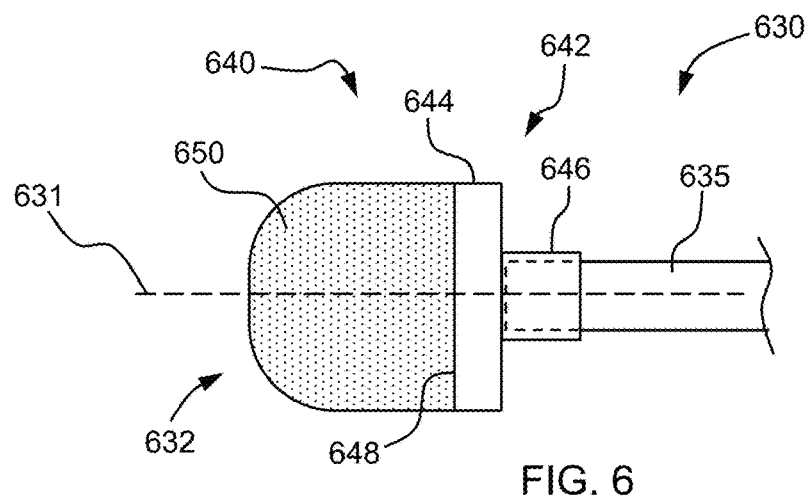
FIG. 6 is a schematic top view of an end of a boom of an aircraft.

FIG. 6 is a schematic depiction of an impact attenuating boom tip 640 at the front end 632 of a boom 630. The boom 630 includes an elongate structural member 635 that extends along an axis 631. While only a portion of the boom 630 is shown in FIG. 6, the elongate structural member 635 extends along the axis 631 from the front end 632 of the boom 630 to the rear end of the boom 630. Similar to the booms shown in FIG. 4, the boom 630 forms a support for a plurality of propeller units and may include a stabilizer at the rear end.

In the illustrated embodiment, the elongate structural member 635 is formed as a cylindrical rod, such as a hollow carbon fiber rod, and the axis 631 is the central axis of the cylindrical rod. In other embodiments, the elongate structural member may have a different shape. In such a case, the axis may be defined by a line that extends through the elongate structural member and is aligned with the direction of elongation of the structural member.

Further, in some embodiments the elongate structural member may be formed as a single integral piece that extends from the boom tip at the front end of the boom to the rear end of the boom, for example where a stabilizer is provided. In other embodiments the elongate structural member may be formed in sections that are coupled together. For example, in some embodiments, the elongate structural member may be formed of several tubes that are coupled together by joints. Using a single integral piece may allow for a lighter construction, while using several pieces may allow for greater flexibility in the design and performance.

The boom tip 640 shown in FIG. 6 includes a cap 642 that is secured to the end of the elongate structural member 635. The cap 642 includes a support platform 644 and a receiving sleeve 646 that extends rearward from the support platform 644. The receiving sleeve 646 is formed by a hollow cylindrical wall that is sized and shaped to receive the elongate structural member 635. In the illustrated embodiment, the receiving sleeve 646 has a circular shape to accommodate the carbon fiber rod of the structural member 635. In other embodiments, the receiving sleeve may have another shape adapted to receive the elongate structural member. Alternatively, in some embodiments, the cap may have another structure for attachment to the elongate structural member. For example, in some embodiments, the cap may include individual flanges that are adapted to attach to the structural member, rather than a sleeve. Further, in some embodiments the support platform of the cap may include a recess for receiving the elongate structural member without any structure extending rearward from the support platform.

The support platform 644 of cap 642 extends outward from the axis 631 of the boom 630 and includes a front surface 648 that has a larger area than the cross-section of the elongate structural member 635. Accordingly, any force exerted on the front end 632 of the boom 630, such as from a collision, will be spread across the support platform 644 reducing the concentration of the impact on the impacted object. For example, in some embodiments, the front surface of the support platform is at least 5 times the cross-sectional area of the elongate structural member, or at least 10 times the cross-sectional area of the elongate structural member.

The boom tip 640 also includes an energy absorber 650 disposed on the front surface of the support platform 644. The energy absorber 650 is configured to deform upon impact and absorb energy as it deforms. Accordingly, in addition to spreading the concentration of an impact upon collision, the boom tip also absorbs some of the energy of the impact. The energy absorber may have various different configurations and be formed of various different materials that absorb energy by deforming. For example, the energy absorber may be formed of a crushable material, such as foam. Alternatively, the energy absorber may be formed of materials that crumple upon impact, such as layers of thin metal, or a collapsible frame. Other energy absorbing configurations are also possible, including combinations of energy absorbing materials.

Figure 7A:
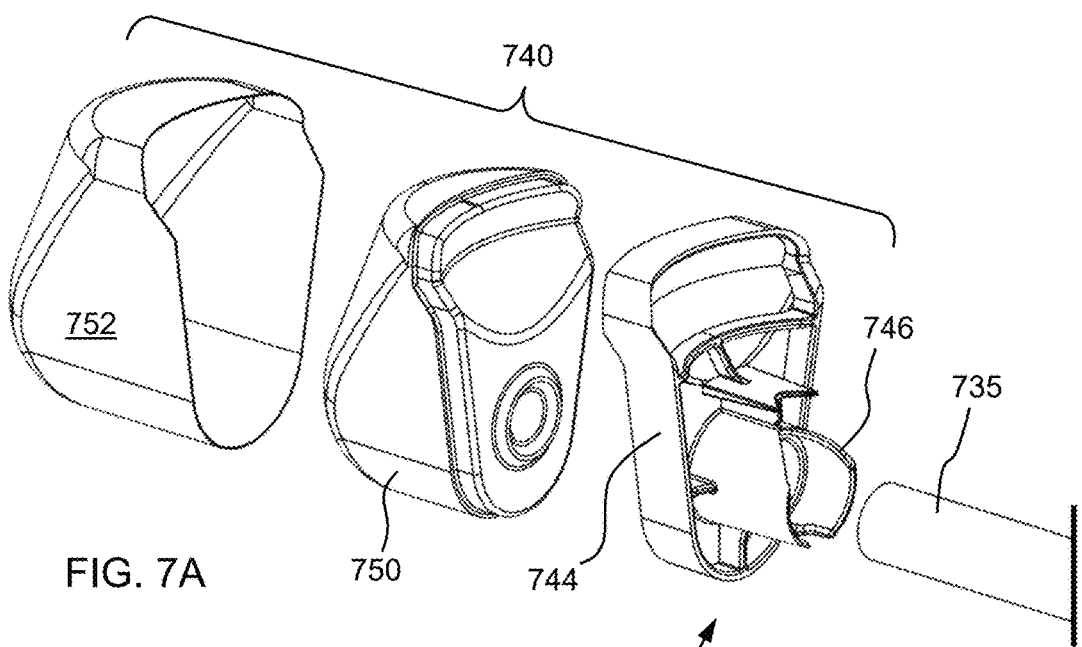
FIG. 7A is an exploded perspective view of a boom tip, according to an example embodiment.

FIG. 7A shows an exploded detailed view of a boom tip 740 disposed at the end of an elongate structural member 735 of a boom. The boom tip 740 includes a cap 742 with a support platform 744 and a receiving sleeve 746 that receives the end of the elongate structural member 735. Only a small portion of the end of the structural member 735 is depicted so that details of the boom tip 740 can be seen. The support platform 744 is substantially larger than the cross-sectional area of the elongate structural member 735 and is configured to spread the force of an impact over a greater area than the cross-sectional area of the elongate structural member.

The boom tip 740 also includes an energy absorber 750 that attaches to the support platform 744 and is configured to absorb energy of an impact, as explained above. As illustrated by a comparison of FIG. 6 with FIGS. 7A and 7B, while the boom tip may have a symmetrical configuration with a flat support platform, such as boom tip 640, more complex configurations are also possible. For example, the support platform 744 of boom tip 740 has an area near its top that extends further forward than the area surrounding receiving sleeve 746. Likewise, the energy absorber 750 is asymmetrical and is thicker near the bottom boom tip 740 where the structural element is received. Other complex geometries are also possible.

The boom tip 740 also includes a protective sheath 752 that covers the energy absorber 750 and support platform 744. The sheath 752 may help avoid damage to the energy absorber, such as from scratches. The sheath 752 may also help deter moisture from penetrating the energy absorber.

Figure 7B:
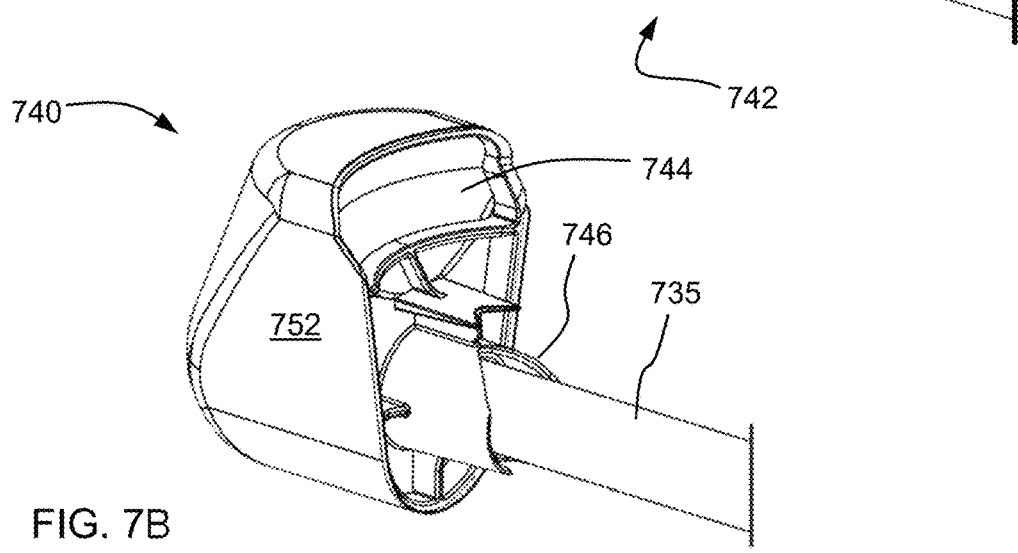
FIG. 7B is a perspective view of the boom tip of FIG. 7A.

Boom tip 740 is shown assembled in FIG. 7B, with the elongate structural member 735 secured in the receiving sleeve 746 of the cap 742. The energy absorber 750 is held against the support platform 744 of the cap 742 and inside the protective sheath 752, which hides the energy absorber from view.

Figure 8:
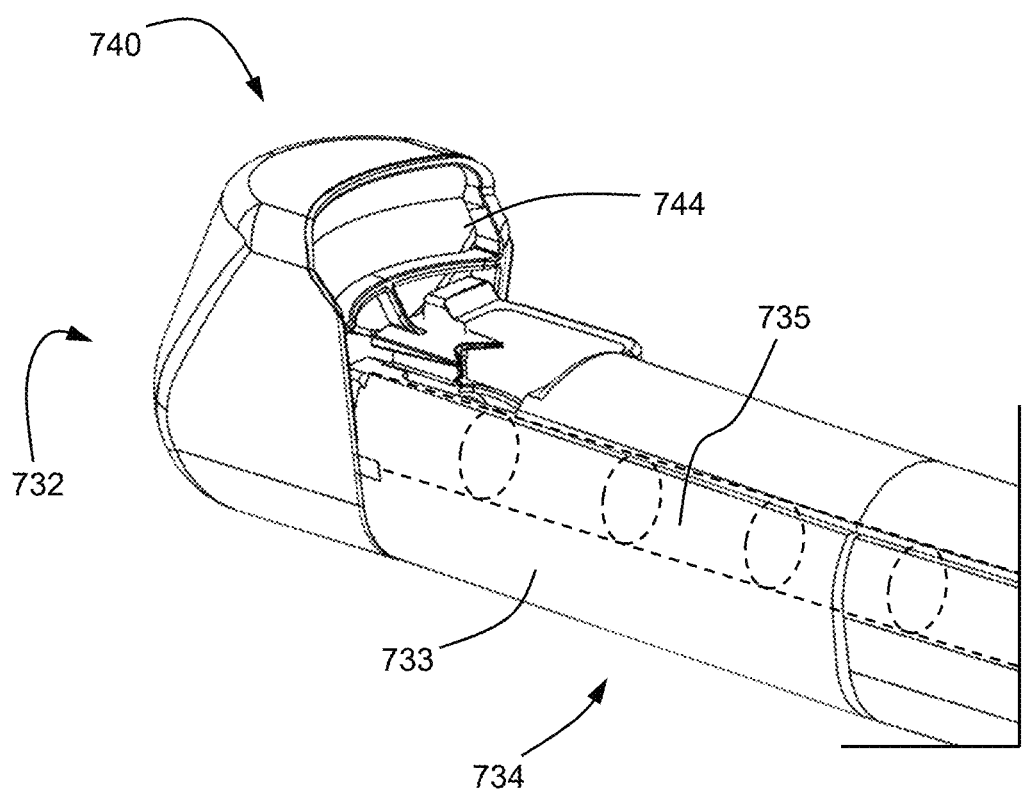
FIG. 8 is a perspective view of a boom tip, according to another example embodiment.

In some embodiments, portions of the longitudinal extension of the boom may be formed exclusively by the elongate structural member, such that the elongate structural member is exposed, as shown in FIGS. 7A and 7B. In other embodiments, the elongate structural member may form the core of a larger longitudinal body that extends along the boom. For example, FIG. 8 shows the front end 732 of a boom 730 that includes a longitudinal body 734 extending along the length of the boom. The longitudinal body 734 includes the elongate structural member 735 as its core and a cover 733 that surrounds the structural member 735. In FIG. 8, the elongate structural member 735 is shown with dashed lines, as the cover 733 hides the structural member 735 from view.

As shown in FIG. 8, the support platform 744 of the boom tip cap has an area that is larger than the cross-sectional area of the entire longitudinal body 734, and not just larger than the elongate structural member 735 itself. In particular, the support platform 744 extends upward past the outer perimeter of the longitudinal body. In some embodiments, the size of the front surface of the support platform may be at least 25% greater than the cross-sectional area of the longitudinal member.

Figure 9A:
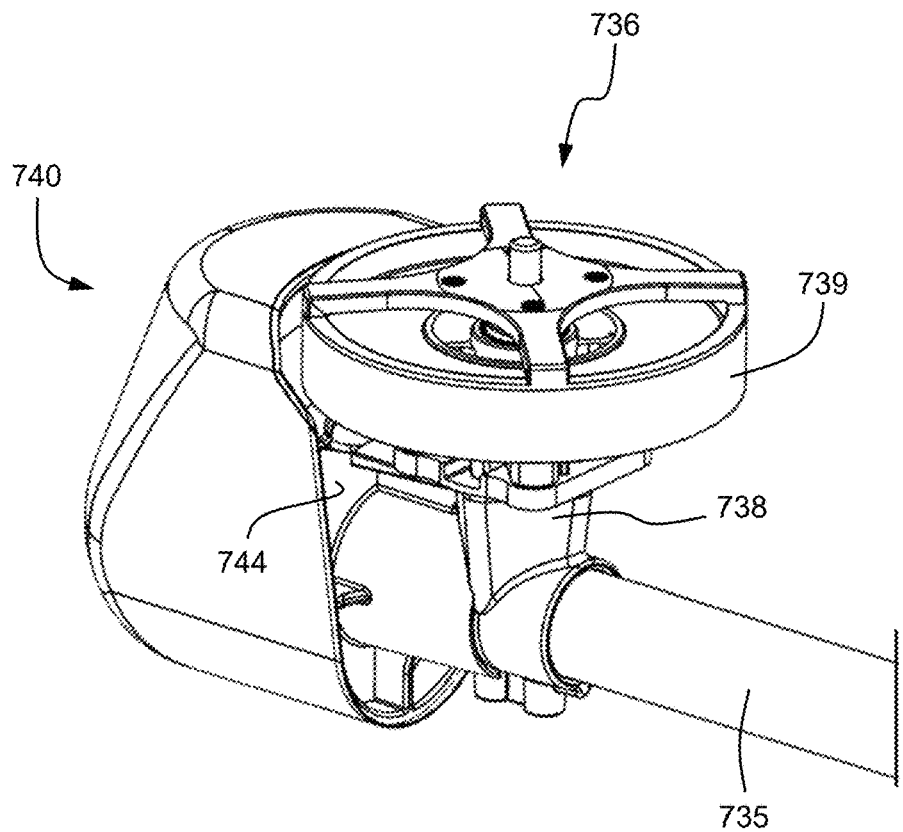
FIG. 9A is a perspective view of a boom tip, according to another example embodiment.
Figure 9B:
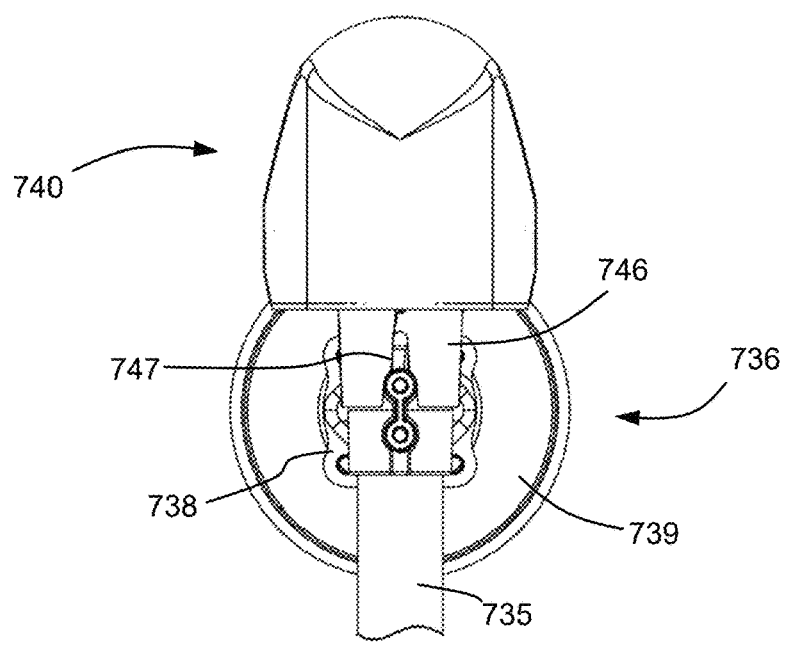
FIG. 9B is a bottom view of the boom tip of FIG. 9A.

In some embodiments a lift propeller unit secured to the boom is attached near the front end of the boom such that the propeller unit is adjacent to the boom tip. Such a configuration is shown in FIGS. 9A and 9B, which includes the same boom tip 740 as shown in FIGS. 7A, 7B and 8 with a portion of a propeller unit 736 secured to the elongate structural member 735. Specifically, the lift propeller unit 736 includes a mount 738 attached to the elongate structural member 735, for example with adhesives and/or mechanical fasteners. A motor 739 is secured to the top of the mount 738 for driving a lift propeller (see FIG. 4).

The mount 738 of the propeller unit 736 couples with the cap of the boom tip 740, which helps transmit forces between the boom tip 740 and the elongate structural member 735. Further, the motor 739, which is relatively dense and securely held in place, is positioned immediately adjacent to support platform 744 of the cap and may brace against the support platform 744 during a collision.

As shown in the bottom view of FIG. 9B, the receiving sleeve 746 of the cap may include a slot 747 that attaches around a portion of the mount 748 of the propeller unit 736. Accordingly, the mount 748 can help maintain the orientation of the boom tip 740 with respect to the elongate structural member 735 using the robust coupling of the propeller unit mount 748 to the elongate structural member 735.

Figure 10A:
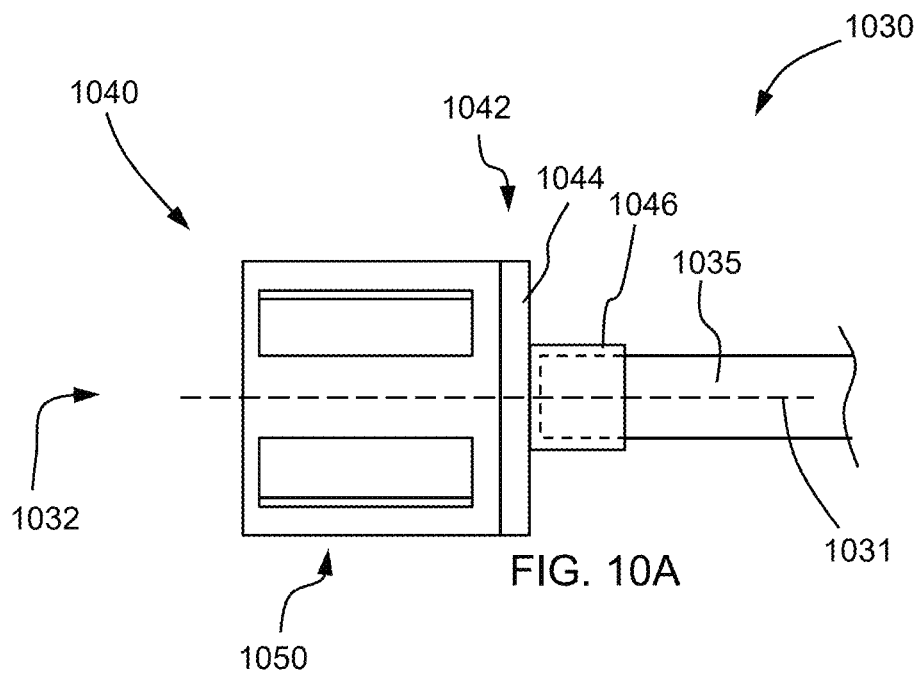
FIG. 10A is a schematic top view of a boom tip, according to an example embodiment.
Figure 10B:
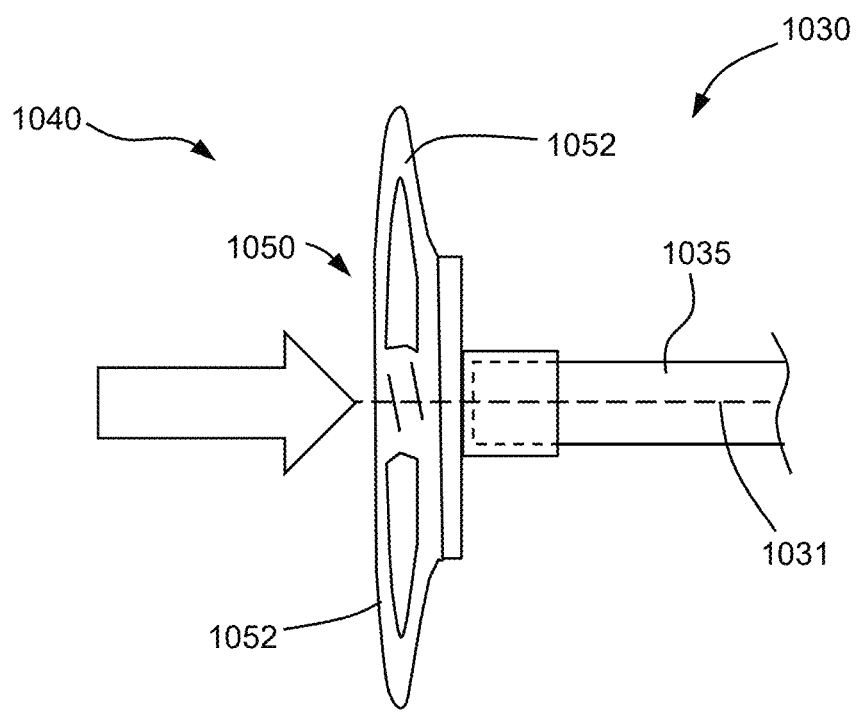
FIG. 10B is a schematic top view of the boom tip of FIG. 10B after impact.

FIGS. 10A and 10B are a schematic depiction of another impact attenuating boom tip 1040 before and after impact. The boom tip 1040 is disposed at the front end 1032 of a boom 1030. The boom 1030 includes an elongate structural member 1035 that extends along an axis 1031. Like the other structural members described above, the elongate structural member 1035 extends along the axis 1031 from the front end 1032 of the boom 1030 to a rear end with a stabilizer and supports a plurality of lift propeller units.

The boom tip 1040 includes a cap 1042 with a support platform 1044 and a receiving sleeve 1046 that couples to the elongate structural member 1035. A deformable structure 1050 is attached to the front side of the support platform 1044 and includes an end surface 1052 and a plurality of walls 1052. Upon impact, the walls 1052 collapse such that the impacting surface of the boom tip 1040 spreads out. Accordingly, the force of the impact is spread over a larger area, which may limit damage caused by a collision.

Figure 11:
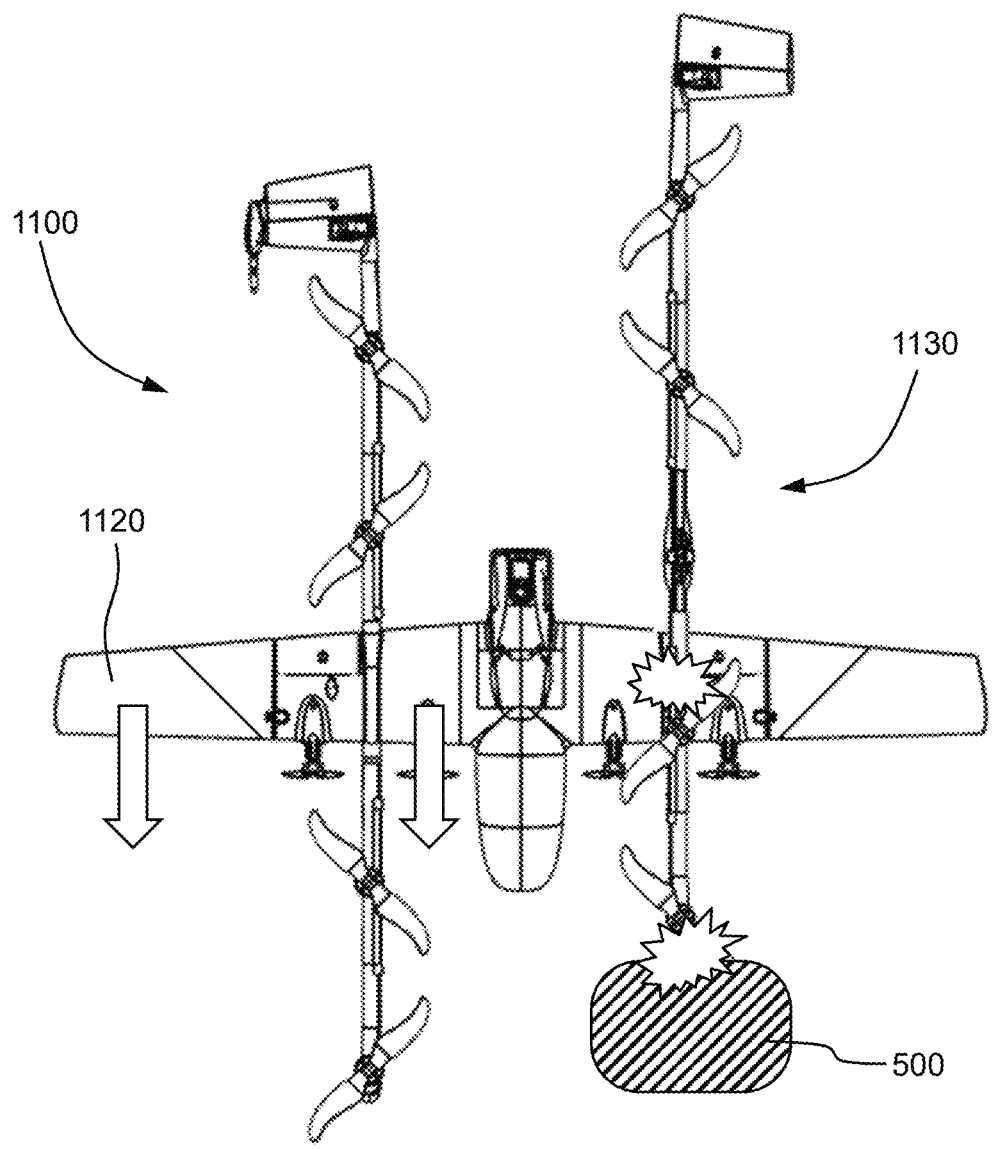
FIG. 11 illustrates the UAV of FIG. 4 during another collision.

FIG. 11 illustrates the result of another impact attenuating feature when a UAV 1100 experiences a collision with impact object 500. Upon impact, portions of a joiner that connect a boom 1130 with a spar extending through wing 1120 separate, allowing the boom 1130 to detach from the remainder of the UAV. As a result, the full inertia of the UAV 1100 is not concentrated at the end of the front end of the boom 1130.

Figure 12A:
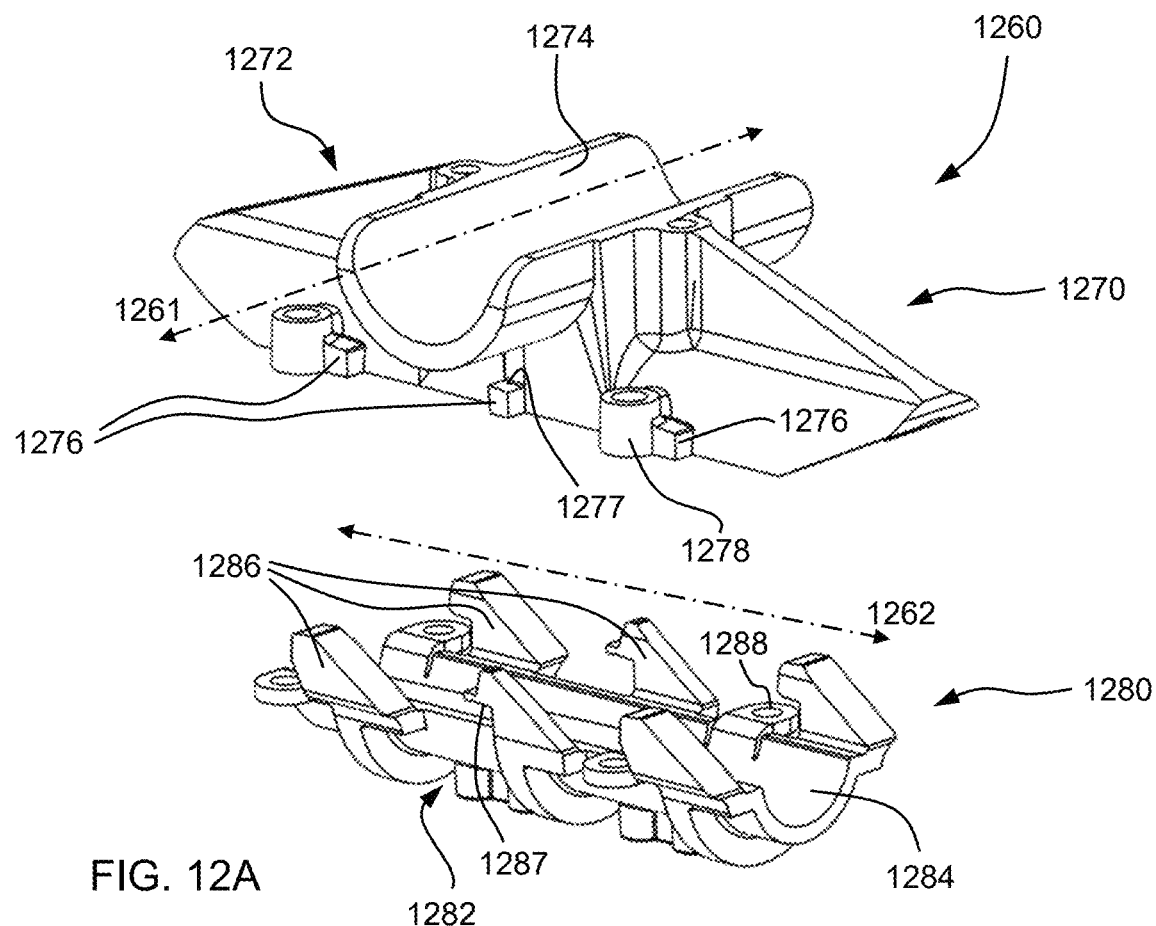
FIG. 12A shows an exploded perspective view of a joiner for structural members, according to an example embodiment.
Figure 12B:
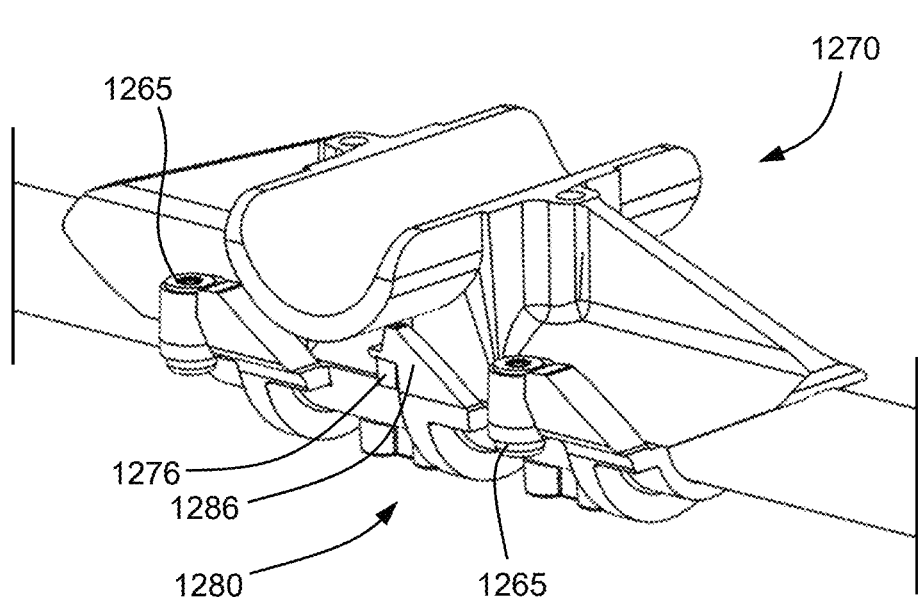
FIG. 12B shows a perspective view of the joiner of FIG. 12A.
Figure 12C:
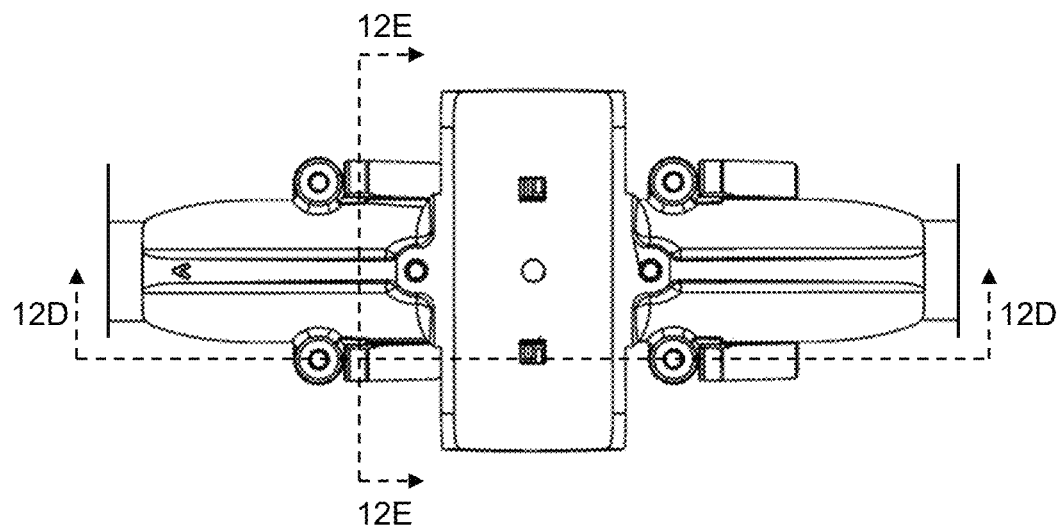
FIG. 12C shows a top view of the joiner of FIG. 12A.
Figure 12D:
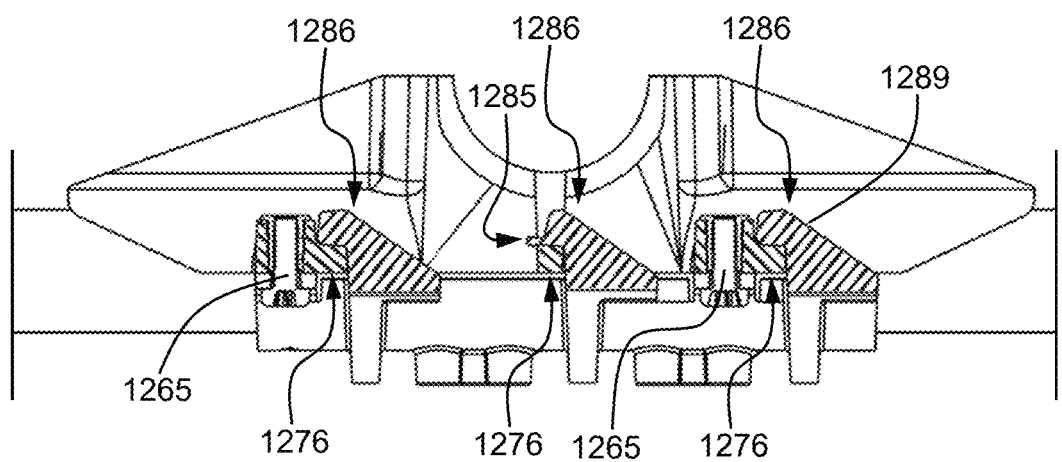
FIG. 12D shows a cross-sectional view of the joiner of FIG. 12A taken along lines 12D-12D in FIG. 12C.
Figure 12E:
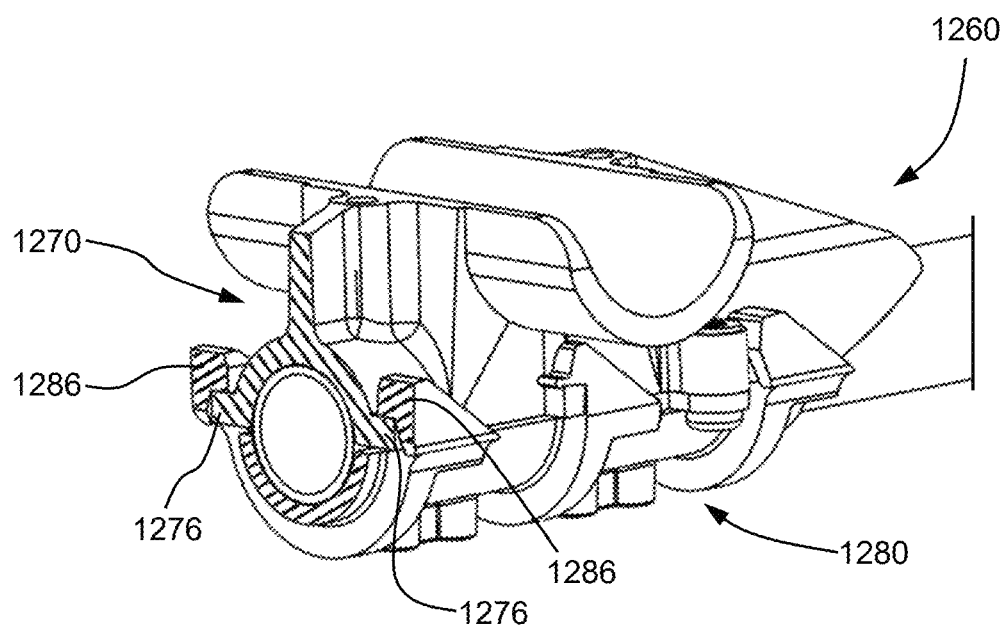
FIG. 12E shows a cross-sectional view of the joiner of FIG. 12A taken along lines 12E-12E in FIG. 12C.
Figure 12F:
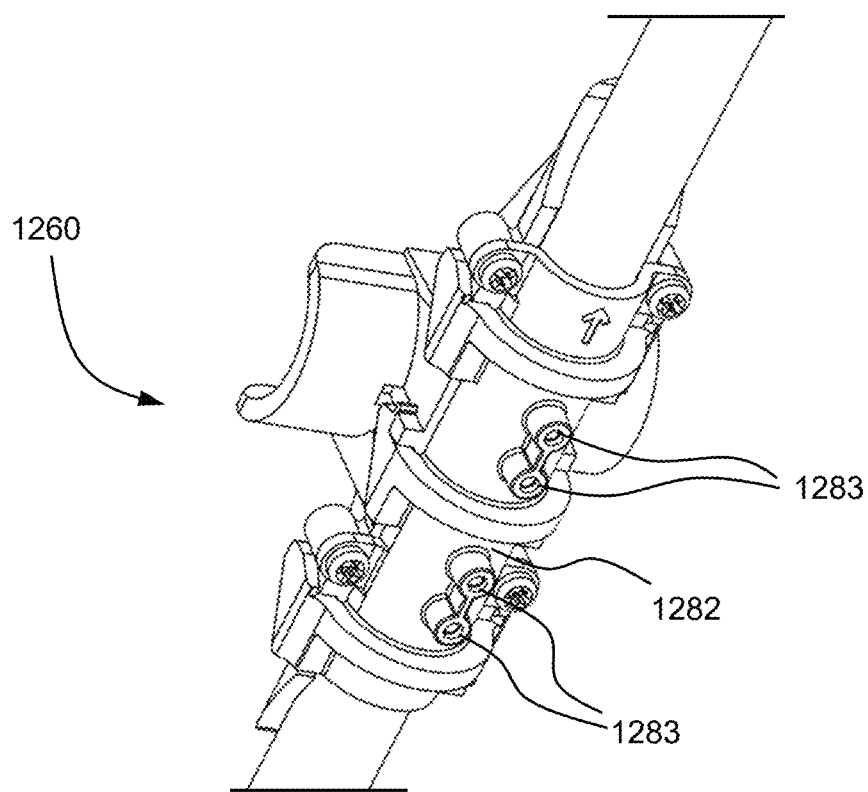
FIG. 12F shows a lower perspective view of the joiner of FIG. 12A.

Such a joiner is shown in FIGS. 12A-12F. FIG. 12A shows joiner 1260 in an exploded view with a first portion 1270 and a second portion 1280 separated from one another, while FIG. 12B shows the first portion 1270 coupled to the second portion 1280 and attached to one another by a series of fasteners 1265, as discussed further below. FIG. 12C illustrates a top view of the assembled joiner 1260 and shows cross-sectional planes associated with FIGS. 12D and 12E. Specifically, FIG. 12D is taken along line 12D-12D in FIG. 12C, and FIG. 12E includes a cross-section taken along line 12E-12E in FIG. 12C. FIG. 12F shows a lower perspective view of the assembled joiner 1260.

The first portion 1270 of joiner 1260 is configured to be secured to an elongate structural member that extends in a first direction 1261. As an example, such a structural member may be a spar of a wing or another structural member of an airframe. The first portion 1270 may be adapted to be fixedly mounted to the first elongate structural member such that the first portion 1270 and first elongate structural member remain coupled to one another during a collision. For example, the first portion 1270 may be secured to the elongate structural member with an adhesive or mechanical fasteners that provide a sufficiently strong attachment to remain attached during impact.

Similarly, the second portion 1280 of joiner 1260 is configured to be secured to a second elongate structural member that extends in a second direction 1262. As an example, such a structural member may be a boom of an airframe. The second portion 1280 may be secured to the second elongate structural member with an adhesive, mechanical fasteners or another configuration that may maintain a connection between the second portion 1280 and second elongate structural member during a collision.

The first portion 1270 of the joiner 1260 includes a first body 1272 with a receiving surface 1274 that is sized and shaped to receive the first elongate structural member. The term receive, as described herein, may include direct contact between the receiving surface and the elongate structural member, or may include indirect contact where a structure or layer is disposed between the receiving surface and structural member.

In the illustrated embodiment, the receiving surface 1274 follows a cylindrical path to contact the outer surface of a cylindrical structural member, but the structural member may take other shapes than cylindrical, such as rectangular and the receiving surface could be modified to engage with the form of the outer surface of the structural member. The first portion 1270 also includes a group of first coupling structures 1276 disposed on the first body 1272. The first coupling structures 1276 are formed as a plurality of protrusions that extend outward from the first body 1272. These protrusions are configured to cooperate with corresponding features of the second portion 1280 as described below.

The second portion 1280 includes a second body 1282 with a receiving surface 1284 that is sized and shaped to contact the second elongate structural member. In this exemplary embodiment, the receiving surface 1284 is configured in the shape of a cylindrical section and is adapted to contact the outer surface of a cylindrical structural member, but other shapes of a structural member may be used and the shape of the receiving surface will be modified to accommodate the respective shape of structural member. The second portion 1280 also includes a group of second coupling structures 1286 that are disposed on the second body 1282. The second coupling structures 1286 are formed as tabs that extend up from the second body 1282 and are configured to hook over the protrusions that form the first coupling structures 1276. The cross-sectional views in FIGS. 12D and 12E illustrate how the second coupling structures 1286 extend up from the second body 1282 and hook over the first coupling structures 1276.

When the first and second portions of the joiner 1260 are coupled to one another, and the second coupling structures 1286 extend over the first coupling structures 1276, a downward facing engagement surface 1287 of the second coupling structures 1286 mates with an upward facing engagement surface 1277 of the first coupling structures 1276. As a result, the mating engagement surfaces can transfer flight loads between the second portion 1280 and the first portion 1270 of the joiner 1260, as well as limit relative movement between the first portion 1270 and second portion 1280 with respect to the first direction 1261 and with respect to a vertical direction.

On the other hand, the engagement surfaces 1277 and 1287 of the coupling structures 1276 and 1286 are oriented and positioned so as not to limit relative movement between the first and second portions of the joiner along the second direction 1262. For example, as shown in the cross-sectional view of FIG. 12D, the second coupling structures 1286 of the lower second portion 1280 can move toward the right in this image and away from the protrusions that form the first coupling structures 1276. Accordingly, the coupling structures are configured to allow the second portion 1280 of the joiner to move rearward and separate from the first portion 1270 of the joiner when a substantial force is exerted on the front end of the second elongate structural member. (That said, the second coupling structures 1286 hook over the first coupling structures 1276 from the rear, such that forward movement of the second portion with respect to the first portion is limited by potential interference between the coupling structures.)

In some embodiments, relative movement between the first portion and second portion along the second direction is restrained by one or more releasable attachments. For example, joiner 1260, shown in FIGS. 12A-12E includes two types of releasable attachments that restrain movement between the first and second portions along the second direction 1262. First, the joiner 1260 includes frangible fasteners 1265 that hold the first and second portions together. Specifically, the second portion 1280 of the joiner includes flanges 1288 with fastener holes and the first portion 1270 includes bosses 1278 for receiving frangible fasteners 1265 that extend through the flanges 1288. This allows the two portions to be secured together. However, the fasteners are frangible, such that they will break when a force exerted on the joiner exceeds a threshold. Accordingly, if a collision occurs, the frangible fasteners 1265 can fail and allow the second portion 1280 of the joiner 1260 to move with respect to the first portion 1270.

The joiner 1260 also includes a releasable attachment in the form of a latch 1285 (FIG. 12D) on one or more of the second coupling structures 1286 that fastens onto the first coupling structure 1276. The latch may be configured to automatically secure the portions of the joiner together when they are coupled. For example, when the second coupling structure 1286 is slid into place over the first coupling structure 1276, the latch catches on the opposite side of the first coupling structure 1276 and holds the portions together. However, the latch may be a force-activated release latch, such that when a force on the latch exceeds a threshold, the latch is released. For example, the latch 1285 may have a snap-fit construction that flexes and releases under a certain load. Alternatively, the latch may have a construction that breaks to release the connection provided by the latch.

In the illustrated embodiment, the first portion 1270 of the joiner 1260 includes receiving surfaces to engage both a first elongate structural member and a second elongate structural member. However, in other embodiments, the second portion may be configured to engage both structural members while the first portion only engages one. Further still, in some embodiments, both portions may engage only their respective elongate structural member.

In some embodiments, the second portion may include one or more ramped surfaces adapted to separate the second portion from the first portion when the second portion moves with respect to the first section along the second direction. For example, in joiner 1260, the rear side of each second coupling structure 1286 includes a ramped surface 1289 that extends downward. Accordingly, if an impact force is exerted on the second elongate structural member, thus driving the second portion 1280 of the joiner 1260 rearward, the ramped surfaces 1289 of the second coupling structures 1286 will engage surfaces of the first coupling structure 1276 and be pushed downward and away from the first coupling structure 1276. As a result, separation between the first portion and second portion will be promoted as the second elongate structural member moves rearward.

In some embodiments, the body of either joiner portion may include mounting bosses that access the respective receiving surface. For example, as shown in FIG. 12F, the second body 1282 includes mounting bosses 1283 that extend from an exterior surface to the receiving surface 1284 (FIG. 12A) that contacts the second elongate structural member. The mounting bosses 1283 may act as a port for adhesive during assembly, or may enable additional components to be mounted to the joiner 1260.

Figure 13A:
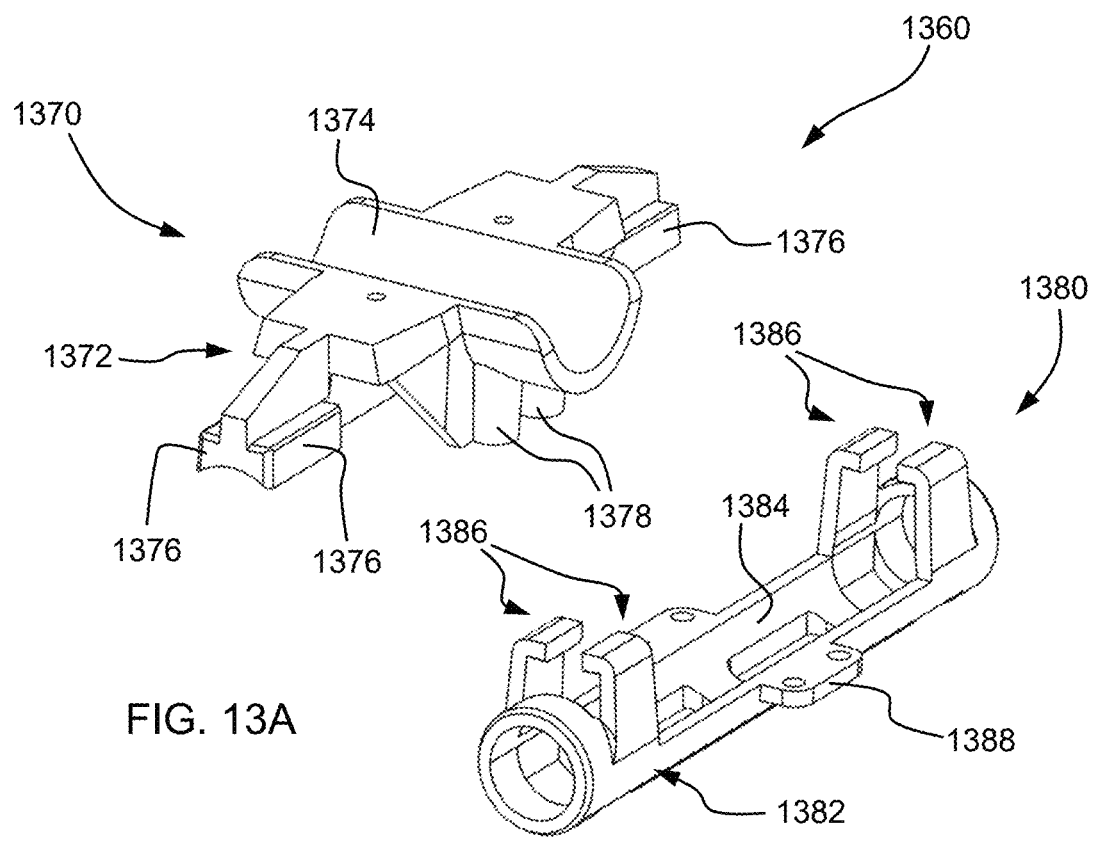
FIG. 13A shows an exploded perspective view of a joiner for structural members, according to an example embodiment.
Figure 13B:
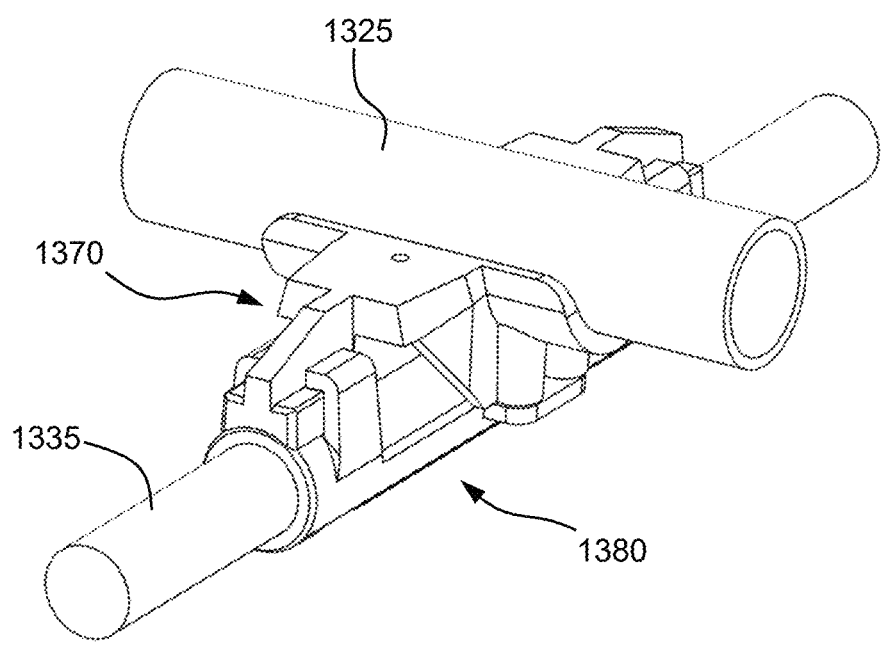
FIG. 13B shows a perspective view of the joiner of FIG. 13A.
Figure 13C:
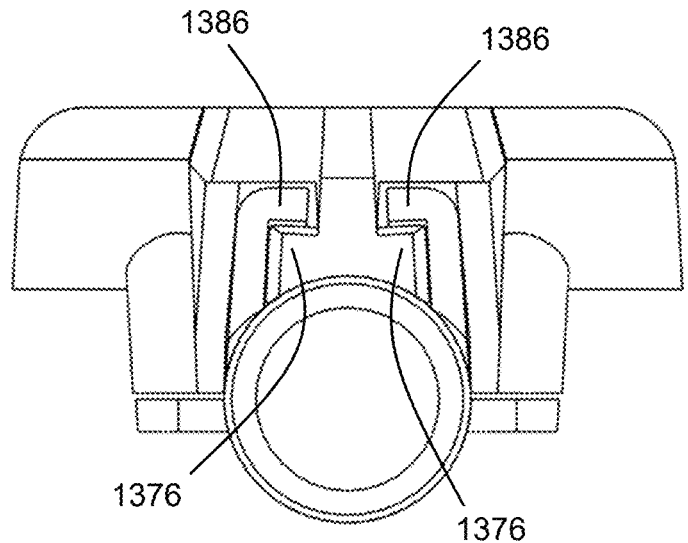
FIG. 13C shows a front view of the joiner of FIG. 13A.
Figure 13D:
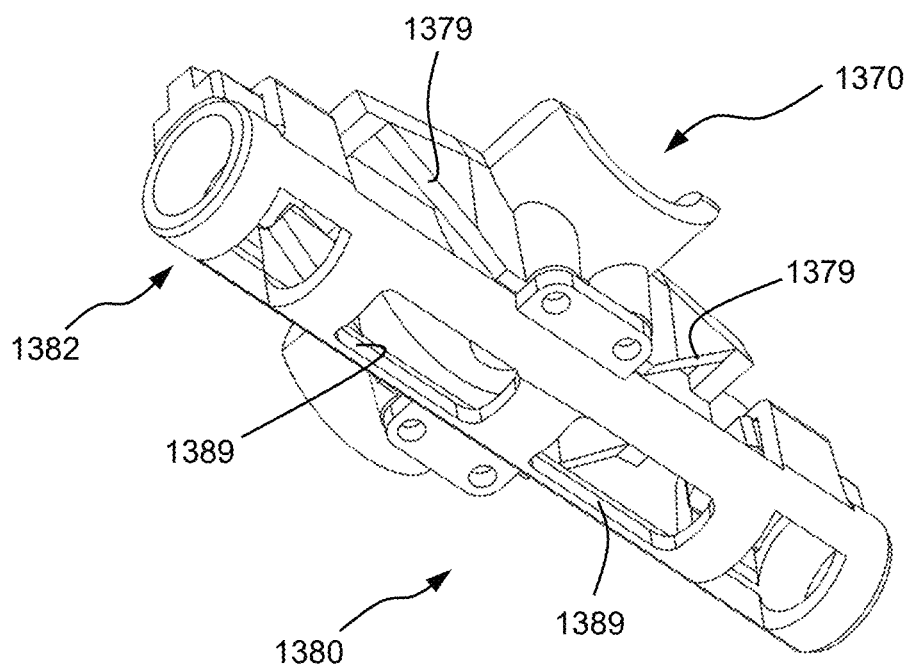
FIG. 13D shows a bottom perspective view of the joiner of FIG. 13A.

FIGS. 13A to 13D illustrate another embodiment of a joiner 1360 configured to couple two elongate structural members. FIG. 13A shows an exploded view of the joiner with a first portion 1370 adapted to attach to a first elongate structural member separated from a second portion 1380 that is adapted to attach to a second elongate structural member. FIG. 13B shows the two portions 1370, 1380 of the joiner 1360 coupled together and attached to sections of respective elongate structural members. FIG. 13C shows a front view of the joiner and FIG. 13D shows a lower perspective view.

The first portion 1370 of joiner 1360 is configured to be secured to an elongate structural member that extends in a first direction, while the second portion 1380 of joiner 1360 is configured to be secured to a second elongate structural member that extends in a direction that is disposed at an angle to the first elongate structural member. For example, as shown in FIG. 13B, the first portion 1370 is attached to the first elongate structural member 1325 while the second portion 1380 is attached to the second elongate structural member 1335, which is perpendicular to the first elongate structural member 1325.

The first portion 1370 of the joiner 1360 includes a first body 1372 with a receiving surface 1374 that is sized and shaped to contact the first elongate structural member 1325. The first portion 1370 also includes a group of first coupling structures 1376 disposed on the first body 1372. The first coupling structures 1376 are formed as flanges of an inverted T structure that extend outward.

The second portion 1380 includes a second body 1382 with a receiving surface 1384 that is sized and shaped to contact the second elongate structural member 1335. The second portion 1380 also includes a group of second coupling structures 1386 that are disposed on the second body 1382. The second coupling structures 1386 are formed as tabs that extend up from the second body 1382 and are configured to hook over the flanges that form the first coupling structures 1376. The front view in FIG. 13C illustrates how the second coupling structures 1386 extend up from the second body 1382 and hook over the first coupling structures 1376.

When the first and second portions of the joiner 1360 are coupled to one another, the coupling structures 1376, 1386 are configured to transfer flight loads between the second portion 1380 and the first portion 1370 of the joiner 1360, as well as limit relative movement between the first portion 1370 and second portion 1380. However, the mating coupling structures 1376 and 1386 are oriented and positioned so as not to limit relative movement between the first and second portions of the joiner along the direction of the second elongate structural member 1335. Accordingly, the coupling structures 1376, 1386 are configured to allow the second portion 1380 of the joiner to move rearward and separate from the first portion 1370 of the joiner when a substantial force is exerted on the front end of the second elongate structural member 1335 during a collision.

During normal operation, the first and second portions of the joiner 1360 may be held together by releasable attachments, for example in the form of frangible fasteners. For example, the second portion 1380 of the joiner includes flanges 1388 with fastener holes and the first portion 1370 includes bosses 1378 for receiving frangible fasteners that extend through the flanges 1388. This allows the two portions to be secured together until the fasteners are broken as a result of a force that exceeds a certain threshold. Accordingly, if a collision occurs, the frangible fasteners 1365 can fail and allow the second portion 1380 of the joiner 1360 to move with respect to the first portion 1370.

If the frangible fasteners break and the second portion 1380 begins to move in the direction of elongation of the second structural member, the first portion 1370 of joiner 1360 includes ramped surfaces 1379 (FIG. 13D) to push the second portion 1380 downward and separate the second portion 1380 and second elongate structural member away from the first portion 1370. Unlike joiner 1260, joiner 1360 is symmetrical along its length, such that the second portion 1380 of the joiner 1360 can be separated from the first portion 1370 as a result of forces in either direction.

As shown in FIG. 13C, the hooked inner ends of the tabs that form the second coupling structures 1386 are angled downward. Likewise, the corresponding surface of the flanges of the first coupling structures 1376 angle downward toward their inner ends. The complementary angle surfaces help ensure that the tabs 1386 do not walk off the flanges 1376.

As shown in FIG. 13D, the body 1382 of the second portion 1380 may include various cutouts 1389 to simplify manufacturing of various components of the joiner, such as the tabs, and to reduce weight.

Figure 14A:
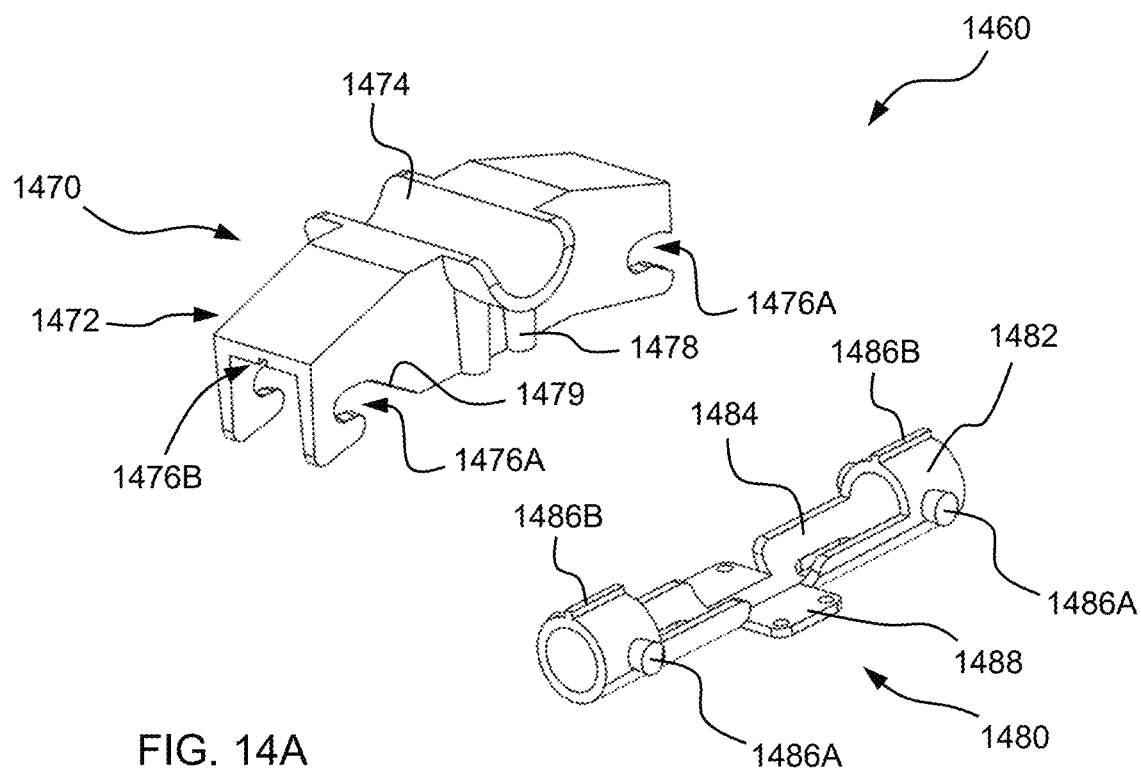
FIG. 14A shows an exploded perspective view of a joiner for structural members, according to an example embodiment.
Figure 14B:
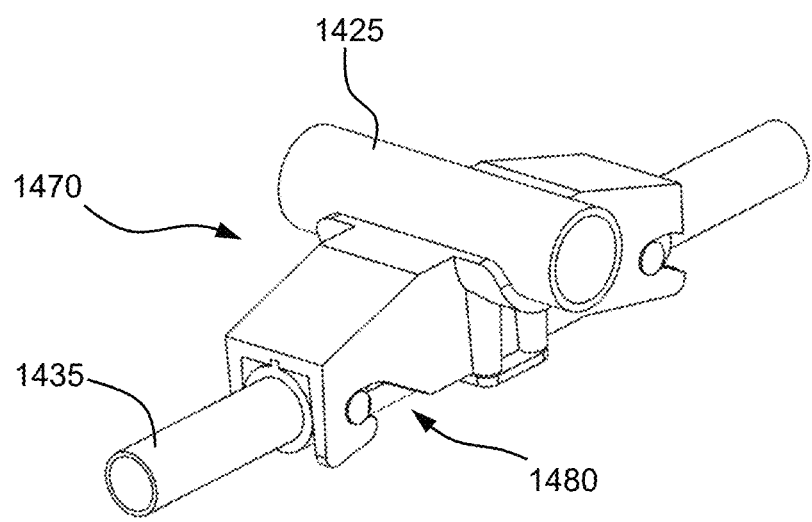
FIG. 14B shows a perspective view of the joiner of FIG. 14A.
Figure 14C:
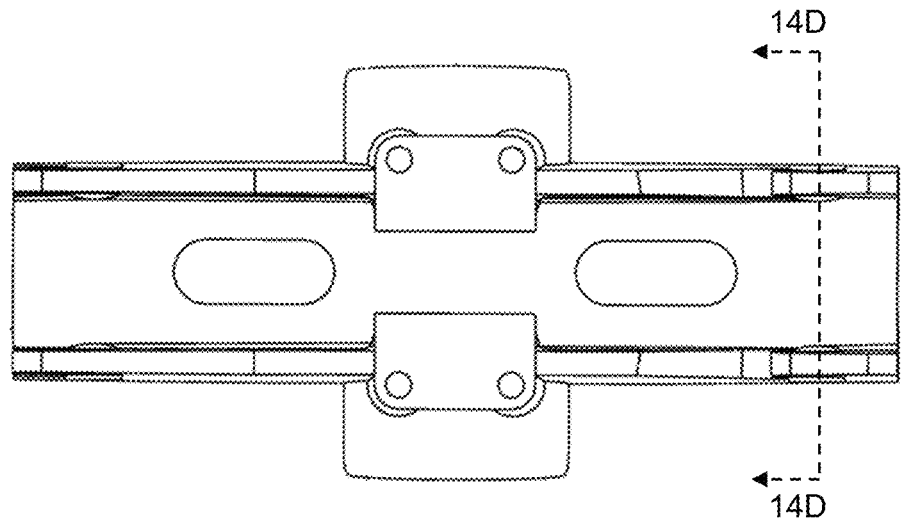
FIG. 14C shows a bottom view of the joiner of FIG. 14A.
Figure 14D:
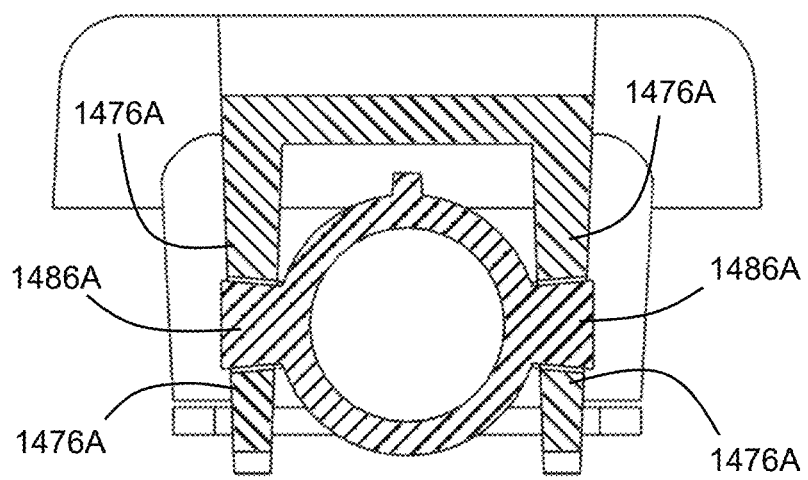
FIG. 14D shows a cross-sectional view of the joiner of FIG. 14A taken along line 14D-14D of FIG. 14C.

FIGS. 14A to 14D illustrate another embodiment of a joiner 1460 configured to couple two elongate structural members. FIG. 14A shows an exploded view of the joiner with a first portion 1470 adapted to attach to a first elongate structural member separated from a second portion 1480 that is adapted to attach to a second elongate structural member. FIG. 14B shows the two portions 1470, 1480 of the joiner 1460 coupled together and attached to sections of respective elongate structural members. FIG. 14C shows a bottom view of the joiner and FIG. 14D shows a cross-sectional front view of the joiner 1460 taken along line 1404-1404 of FIG. 14C.

The first portion 1470 of joiner 1460 is configured to be secured to an elongate structural member that extends in a first direction, while the second portion 1480 of joiner 1460 is configured to be secured to a second elongate structural member that extends in a direction that is disposed at an angle to the first elongate structural member. For example, as shown in FIG. 14B, the first portion 1470 is attached to the first elongate structural member 1425 while the second portion 1480 is attached to the second elongate structural member 1435, which is perpendicular to the first elongate structural member 1425.

The first portion 1470 of the joiner 1460 includes a first body 1472 with a receiving surface 1474 that is sized and shaped to contact the first elongate structural member 1425. The first portion 1470 also includes a group of first coupling structures that includes two types of coupling structures. Specifically, first portion 1470 includes several slots 1476A as well as a groove 1476B.

The second portion 1480 includes a second body 1482 with a receiving surface 1484 that is sized and shaped to contact the second elongate structural member 1435. The second portion 1480 also includes a group of second coupling structures that include two types of coupling structures including protrusions 1486A that fit into the slots 1476A of first portion 1470, as well as ridges 1476B that form a key and fit into the groove 1476B of first portion 1470.

When the first and second portions of the joiner 1460 are coupled to one another, the coupling structures 1476A, 1476B, 1486A, 1486B are configured to transfer flight loads between the second portion 1480 and the first portion 1470 of the joiner 1460, as well as limit relative movement between the first portion 1470 and second portion 1480. However, the coupling structures are oriented and positioned so as not to limit relative movement between the first and second portions of the joiner along the direction of the second elongate structural member 1435. Accordingly, the coupling structures 1476, 1486 are configured to allow the second portion 1480 of the joiner to move rearward and separate from the first portion 1470 of the joiner when a substantial force is exerted on the front end of the second elongate structural member 1435 during a collision.

As with the other embodiments described above, the first and second portions of the joiner 1460 may be held together by releasable attachments, such as frangible fasteners. For example, the second portion 1480 of the joiner includes flanges 1488 with fastener holes and the first portion 1470 includes bosses 1478 for receiving frangible fasteners that extend through the flanges 1488. This allows the two portions to be secured together until the fasteners are broken and the portions of the joiner are allowed to separate.

If the frangible fasteners break and the second portion 1480 begins to move in the direction of elongation of the second structural member, the first portion 1470 of joiner 1460 includes ramped surfaces 1479 along the slots 1476A to push the second portion 1480 downward and separate the second portion 1480 and second elongate structural member away from the first portion 1470.

As shown in FIG. 14D, the protrusions 1486A flare outward and the sides of the slots 1476A taper inward. These complementary angled surfaces allow the walls of the first portion 1470 to be squeezed inward when the joiner 1460 is under load, rather than allowing the protrusions to migrate out of the slot.

Each of the first portions of the joiners of the disclosure may be formed in a single integral piece, or may be formed of separate pieces that are assembled in a unit. Likewise, each of the second portions of the joiners of the disclosure may also be formed in a single integral piece or as separate pieces that are assembled in a unit.

As set forth above, the joiners described herein are adapted to connect two elongate structural members that are angled with respect to one another such that they cross one another. In the illustrated embodiments, the joiners are configured to hold the structural members perpendicular to one another. However, in other embodiments, the joiners may be adapted to hold structural members at other angles, such as 60 degrees or 45 degrees depending on the shape of the associated airframe.

Further, while each of the illustrated embodiments of a joiner is configured to hold the second elongate structural member underneath the first elongate structural member. In other embodiments, the joiner may be configured to hold the second elongate structural member over the first elongate structural member.

VI. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An uncrewed aerial vehicle (UAV) comprising:
 a support extending along a flight direction of the UAV, the support including:
  an elongate structural member extending along an axis that runs through the support from a front end to a rear end,
  a cap coupled to the front end of the elongate structural member, the cap being formed of a first material and including a support platform that has a front surface opposite the elongate structural member and that extends outward from the axis, and
  an energy absorber disposed on the front surface of the support platform, the energy absorber including a second crushable material configured to absorb energy under impact; and
 a first propeller unit coupled to the support.

2. The UAV of claim 1, wherein the elongate structural member is part of a longitudinal body that extends along a length of the support.

3. The UAV of claim 2, wherein the support includes a cover disposed over at least a portion of the elongate structural member.

4. The UAV of claim 3, wherein an area of the support platform is at least 25% greater than a cross-sectional area of the longitudinal body.

5. The UAV of claim 1, wherein an area of the support platform is at least 5 times greater than a cross-sectional area of the elongate structural member.

6. The UAV of claim 1, wherein the elongate structural member is formed as a single integral piece.

7. The UAV of claim 1, wherein an area of the support platform is at least 25% greater than a cross-sectional area of support member along the elongate structural member.

8. An uncrewed aerial vehicle (UAV) comprising:
 a support extending along a flight direction of the UAV, the support including:
  an elongate structural member extending along an axis that runs through the support from a front end to a rear end,
  a cap coupled to the front end of the elongate structural member, the cap including a support platform that has a front surface opposite the elongate structural member and that extends outward from the axis, and
  an energy absorber disposed on the front surface of the support platform, the energy absorber including a crushable material configured to absorb energy under impact; and
 a first propeller unit coupled to the support,
 wherein the support platform includes an upward extension, and wherein a motor of the first propeller unit is disposed adjacent to a rear surface of the upward extension of the support platform.

9. The UAV of claim 1, wherein the energy absorber covers the entire front surface of the support platform.

10. The UAV of claim 1, wherein the crushable material is a foam.

11. The UAV of claim 1, further comprising a stabilizer coupled to the rear end of the support.

12. The UAV of claim 1, further comprising:
 a fuselage; and
 a wing extending from the fuselage, and
 wherein the support is coupled to the wing.

13. The UAV of claim 11, wherein the support platform is disposed in front of a front end of the fuselage with respect to the flight direction of the UAV.

14. The UAV of claim 1, wherein the first propeller unit is one of a plurality of propeller units disposed along the support.

15. An uncrewed aerial vehicle (UAV) comprising:
 a support extending along a flight direction of the UAV, the support including:
  an elongate structural member extending along an axis that runs through the support from a front end to a rear end,
  a cap coupled to the front end of the elongate structural member, and
  a deformable structure supported by the cap and disposed in front of the elongate structural member, the deformable structure including lateral walls that fold outward upon impact such that the deformable structure spreads outward from the axis from an initial position to an impact position; and
 a first propeller unit coupled to the support.

16. The UAV of claim 15, wherein the first propeller unit includes a motor, and wherein the deformable structure, when in the impact position, is adjacent to the motor.

17. The UAV of claim 15, wherein the elongate structural member is formed as a single integral piece.

18. The UAV of claim 15, further comprising a stabilizer coupled to the rear end of the support.

19. The UAV of claim 15, further comprising:
a fuselage; and
a wing extending from the fuselage, and wherein the support is coupled to the wing.

\* \* \* \* \*